US012640447B2

(12) United States Patent
Stecewycz

(10) Patent No.: US 12,640,447 B2
(45) Date of Patent: May 26, 2026

(54) AUTOMOTIVE BATTERY WITH EMBOSSED ELECTRICAL CONTACT SOCKETS

(71) Applicant: Joseph Stecewycz, Groton, MA (US)

(72) Inventor: Joseph Stecewycz, Groton, MA (US)

(73) Assignee: Cytherean Mandelbrot, LLC, Groton, MA (US)

( * ) Notice: Subject to any disclaimer, the term of this patent is extended or adjusted under 35 U.S.C. 154(b) by 712 days.

(21) Appl. No.: 17/958,326

(22) Filed: Oct. 1, 2022

(65) Prior Publication Data

US 2023/0261342 A1     Aug. 17, 2023

Related U.S. Application Data

(60) Provisional application No. 63/309,432, filed on Feb. 11, 2022.

(51) Int. Cl.
| | |
|---|---|
| *H01M 50/553* | (2021.01) |
| *H01M 10/46* | (2006.01) |
| *H01M 50/55* | (2021.01) |
| *H01R 13/04* | (2006.01) |
| *H01R 13/05* | (2006.01) |
| *H01R 13/10* | (2006.01) |
| *H01R 13/514* | (2006.01) |
| *H01R 24/28* | (2011.01) |

| | |
|---|---|
| *H01R 24/76* | (2011.01) |
| *H01R 101/00* | (2006.01) |

(52) U.S. Cl.
CPC ......... *H01M 50/553* (2021.01); *H01M 10/46* (2013.01); *H01M 50/55* (2021.01); *H01R 13/04* (2013.01); *H01R 13/05* (2013.01); *H01R 13/10* (2013.01); *H01R 13/514* (2013.01); *H01R 24/28* (2013.01); *H01R 24/76* (2013.01); *H01M 2220/20* (2013.01); *H01R 2101/00* (2013.01); *H01R 2201/26* (2013.01)

(58) Field of Classification Search
None
See application file for complete search history.

(56) References Cited

U.S. PATENT DOCUMENTS

| | | | |
|---|---|---|---|
| 9,748,755 B1 * | 8/2017 | Markus ............... | H02G 3/0468 |
| 12,407,119 B2 * | 9/2025 | Stecewycz ............. | H02J 7/342 |
| 2019/0199017 A1 * | 6/2019 | Stecewycz ........... | H02J 7/0034 |

* cited by examiner

*Primary Examiner* — Maria Laios
(74) *Attorney, Agent, or Firm* — Joseph Stecewycz

(57) ABSTRACT

An automotive battery includes positive and negative battery contact sockets on the battery surface, each battery contact socket having a socket shell slot in a socket shell such that a polarized electrical connector prong inserted into a designated socket shell slot makes electrical contact with the corresponding battery terminal.

18 Claims, 14 Drawing Sheets

Section A-A

Section A-A

Section B-B

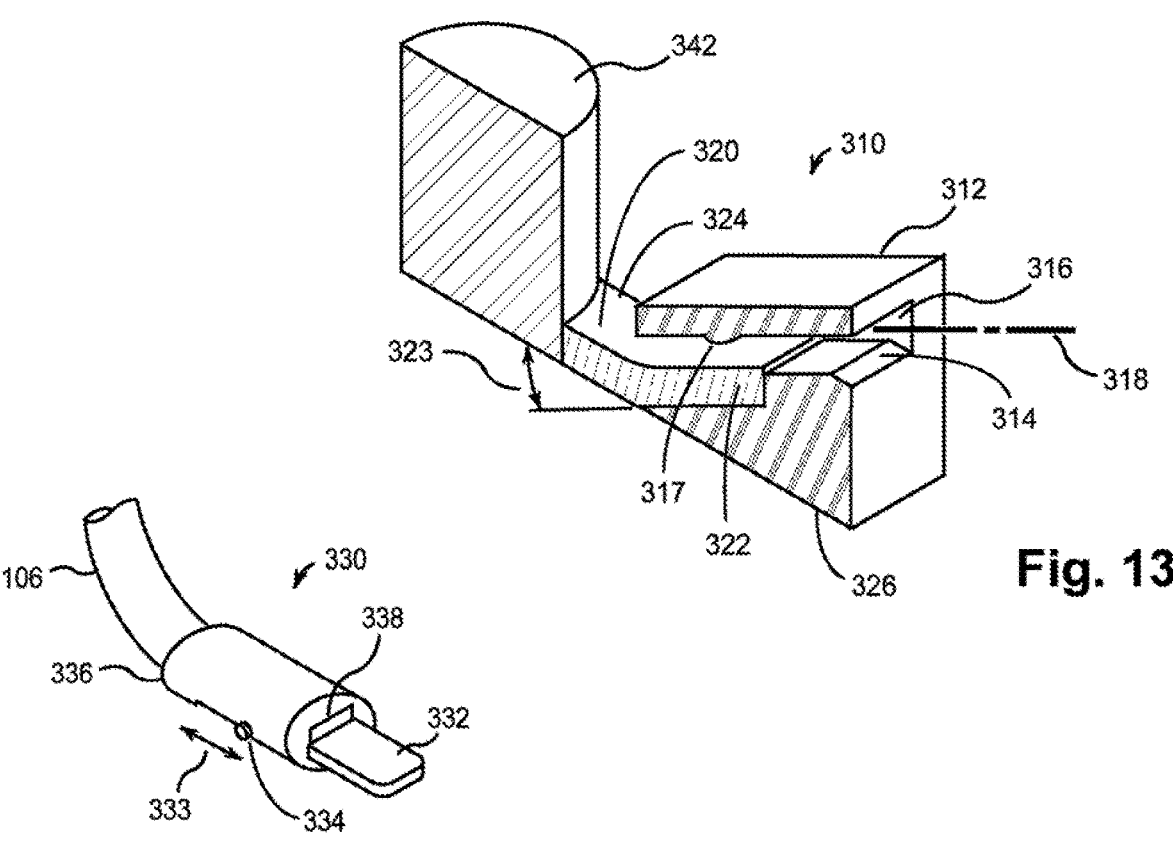
Fig. 13
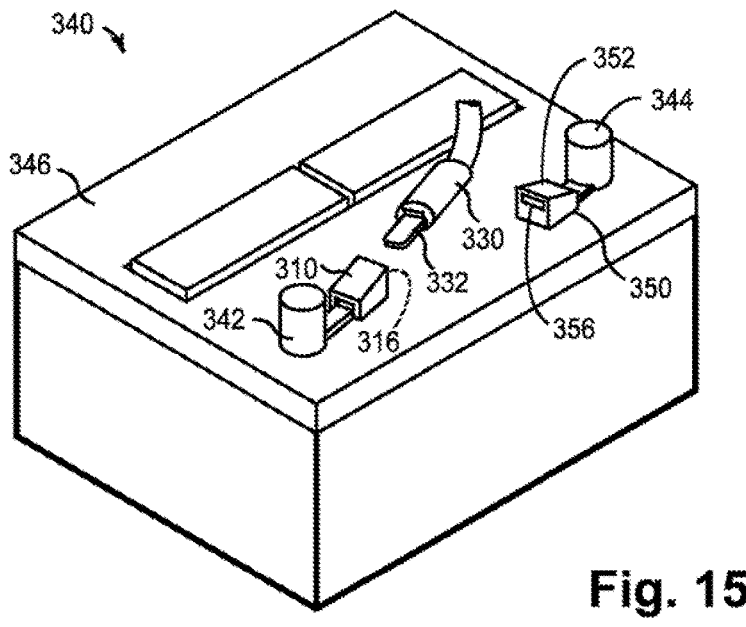
Fig. 14
Fig. 15

Fig. 16
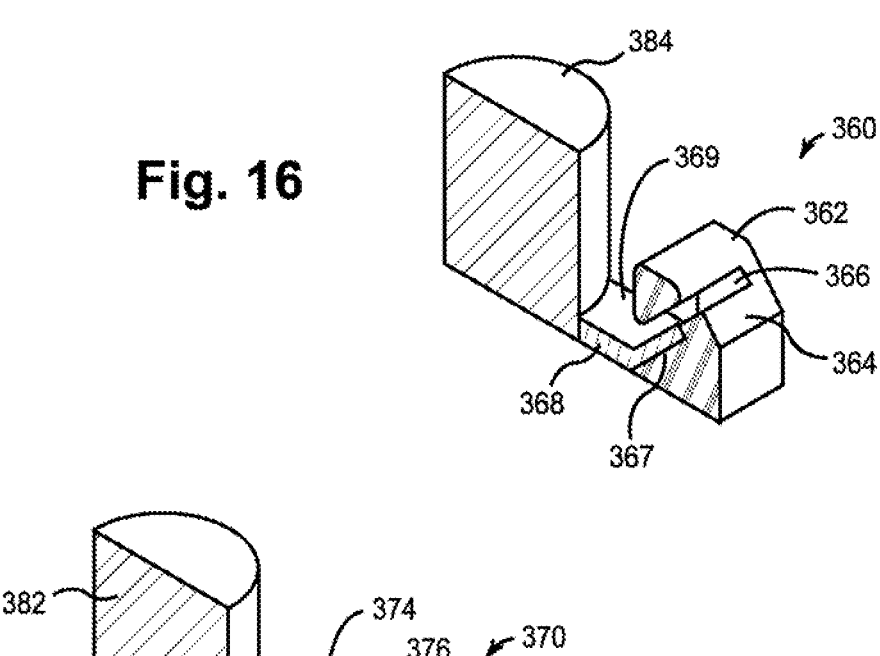
Fig. 17
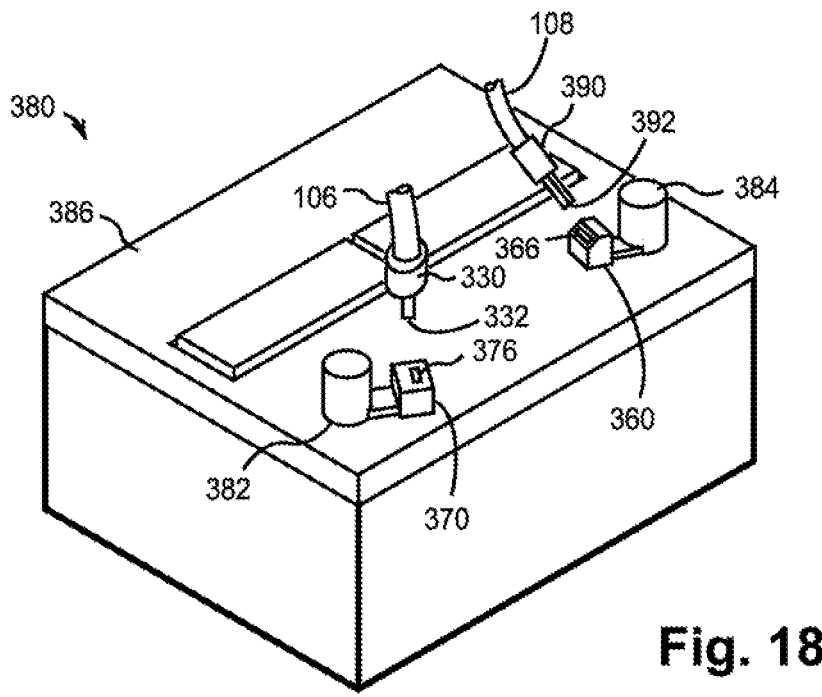
Fig. 18

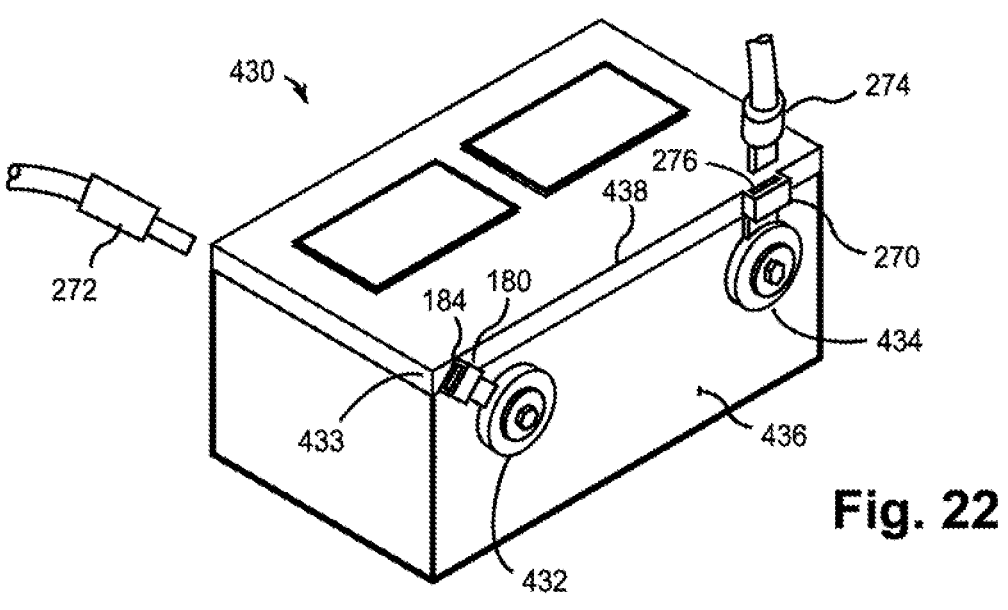
Fig. 22
Fig. 23
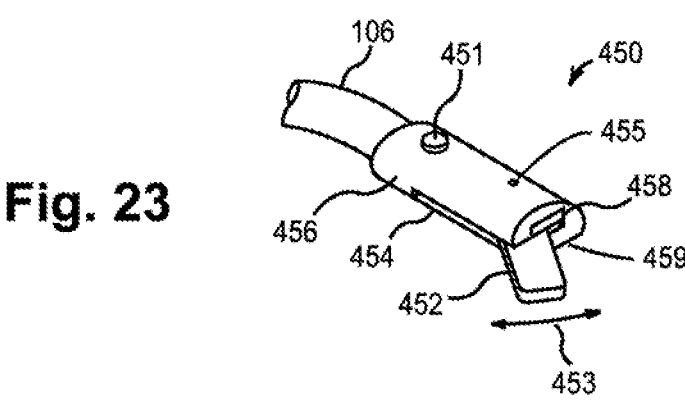
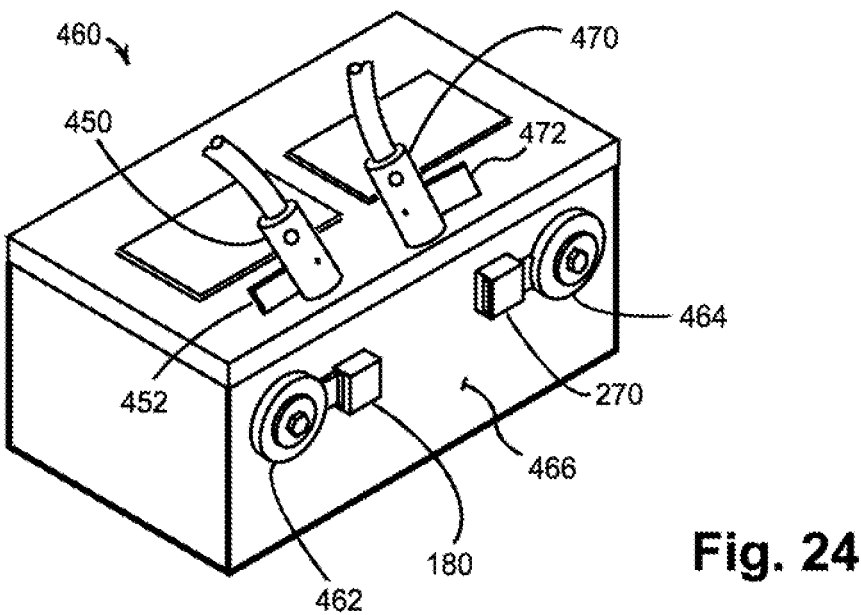
Fig. 24

AUTOMOTIVE BATTERY WITH EMBOSSED ELECTRICAL CONTACT SOCKETS

FIELD OF THE INVENTION

This invention generally relates to automotive batteries and, in particular, to automotive lead-acid batteries incorporating embossed electrical contact sockets for the insertion of electrical connector prongs. This novel method of establishing electrical connection facilitates a battery charging operation without the need for conventional booster cable battery terminal clamps.

BACKGROUND OF THE INVENTION

FIG. 1 is a simplified diagrammatical illustration of a typical, conventional automotive lead acid battery 10 that includes a positive battery terminal 12, a negative battery terminal 14, a battery casing 16, and a battery cover 18. This particular configuration of battery 10 includes optional battery terminal bases 22 at the battery terminals 12, 14. The battery cover 18 is sealed to the battery casing 16, forming a leakproof battery housing 20 to retain internal battery electrolyte solution. Vent caps 24 are provided in the battery cover 18 to prevent buildup of gases in the battery housing 20.

As shown in FIG. 2, a conventional booster cable 30 typically includes "positive" battery terminal clamps 32 and "negative" battery terminal clamps 34 featuring spring-loaded serrated jaws for attachment. The positive battery terminal clamps 32 are connected to opposite ends of a positive insulated electrical conductor 36 and the negative battery terminal clamps 34 are connected to opposite ends of a negative insulated electrical conductor 38. The insulated electrical conductors 36, 38 each have sufficient cross-sectional areas to safely conduct high amperage engine starter current, in accordance with best industry standards.

As is tolerated in common usage, the booster cable 30 suffers from the shortcoming that the serrated jaws of the battery terminal clamps 32, 34, typically made from copper or a copper alloy, produce indentations and scratches on the softer lead alloy battery terminals 12, 14, or on lead alloy engine battery clamps (not shown) secured to the battery terminals 12, 14. Over time, clamping and unclamping operations produces deterioration of the lead alloy surfaces from repeated attachment of the booster cable 30, especially when a user twists and turns the battery terminal clamps 32, 34 to insure good electrical connections.

Another shortcoming is that one or both of the battery terminal clamps 32, 34 may accidentally make contact with the vehicle chassis or metal engine components when a user is in the process of attaching or removing the booster cable 30. A further shortcoming is that the process of connecting the booster cable 30 typically requires the user to engage both hands to prevent the battery terminal clamps 32, 34 from accidentally contacting each other. Proper emplacement of the battery terminal clamps 32, 34 is particularly challenging in a densely populated engine compartment or under poor lighting conditions. Additionally, there is a finite probability that an electrical spark created between one of the battery terminal clamps 32, 34 and one of the battery terminal posts 12, 14 may ignite hydrogen gas produced by battery overcharging.

What is needed is a battery charging apparatus that overcomes the limitations of the prior art by: (i) providing a method of electrically connecting automotive batteries without causing surface damage to battery terminals and to engine battery clamps, (ii) assuring proper polarity when connecting a source battery to a discharged battery, and (iii) reducing generation of electrical sparks that may cause hydrogen gas ignition.

BRIEF SUMMARY OF THE INVENTION

The invention results from the observation that electrical connections to battery terminals on a battery housing can be made by inserting jumper cable electrical plugs into electrical contact sockets electrically connected to the battery terminals. These electrical contact sockets are attached to, or formed as part of, the surface of the battery housing.

In an aspect of the present invention, an automotive battery with a positive battery terminal and a negative battery terminal on a battery housing surface includes: a positive battery contact socket attached to the battery housing surface adjacent to the positive battery terminal, the positive battery contact socket including a positive socket shell with a positive socket shell slot extending therethrough, such that a positive electrical prong can be inserted into the positive socket shell slot and make electrical contact with the positive battery terminal; and, a negative battery contact socket attached to the battery housing surface adjacent to the negative battery terminal, the negative battery contact socket including a negative socket shell with a negative socket shell slot extending therethrough, such that a negative electrical prong can be inserted into the negative socket shell slot and make electrical contact with the negative battery terminal.

In another aspect of the present invention, an automotive battery suitable for connecting with an electrical prong for charging purposes includes: a battery housing with a battery terminal on a battery housing surface; a battery contact socket with a socket shell slot, the battery contact socket attached to the battery housing surface, the socket shell slot configured for insertion of the electrical prong into the battery contact socket; an electrically conductive trace, the electrically conductive trace including a terminal contact trace attached to the battery housing surface, the terminal contact trace secured in electrical contact with the battery terminal; and a prong contact trace electrically attached to the terminal contact trace, the prong contact trace at least partially secured within the socket shell slot, the electrically conductive trace having sufficient cross-sectional area to safely conduct high amperage engine starter current.

In yet another aspect of the present invention, an automotive battery suitable for electrically connecting to an electrical prong for providing charging current to a battery terminal, includes: a battery housing; and, a battery contact socket attached to a surface of the battery housing adjacent to the battery terminal, the battery contact socket including an internal slot extending from a slot opening on the battery contact socket into the battery contact socket, the internal slot configured such that insertion of the electrical prong into the slot opening enables the electrical prong to make electrical contact with one end of an electrically conductive trace inside the internal slot, wherein a second end of the electrically conductive trace is electrically attached to the battery terminal.

The additional features and advantages of the disclosed invention are set forth in the detailed description which follows. These will be apparent to those skilled in the art from the description, or recognized by practicing the invention as described, together with the listed claims and the appended drawings.

BRIEF DESCRIPTION OF THE DRAWINGS

The uses and advantages of the present invention will be more fully appreciated as the same becomes better understood from the following detailed description of the present invention when viewed in conjunction with the accompanying figures, in which:

FIG. 13 is an isometric detail sectional view of a canted positive battery contact socket electrically connected to a positive battery terminal, in accordance with the present invention;

FIG. 14 is positive retractable jumper plug that includes a positive plug retractable prong capable of retraction into a jumper plug grip, in accordance with the present invention;

FIG. 15 is a battery with a canted positive battery contact socket electrically attached to a positive battery terminal, and a canted negative battery contact socket electrically attached to a negative battery terminal, in accordance with the present invention;

FIG. 16 is a cross sectional isometric view of a compact negative battery contact socket configured for use in confined quarters, in accordance with the present invention;

FIG. 17 is a mini positive battery contact socket electrically connected to a positive battery terminal by a positive socket angled electrically conductive trace, in accordance with the present invention;

FIG. 18 is a battery with the mini positive contact socket of FIG. 17 at a positive battery terminal and the compact negative battery contact socket of FIG. 16 at a negative battery terminal on the surface of the battery cover, in accordance with the present invention;

FIG. 22 shows a side terminal battery with a positive battery side terminal and a negative battery side terminal on a battery housing front surface, in accordance with the present invention;

FIG. 23 is a positive cantilever prong jumper plug with a rotatable positive plug cantilever prong secured in a jumper plug grip, in accordance with the present invention;

FIG. 24 shows a side terminal battery with a positive battery side terminal and a negative battery side terminal having a positive battery dimple contact socket secured to a battery front surface, in accordance with the present invention;

DETAILED DESCRIPTION OF THE INVENTION

Various exemplary embodiments of the present invention are described in the specification below, each with reference to the appropriate Figure(s). It should be understood that, for clarity of illustration, not all disclosed battery and cable components are shown to the same scale, or in correct proportion to one another, and should not be taken as literal illustrations of actual battery and cable components. In particular, the vertical (i.e., height) dimensions of the embossed battery contact socket elements have been exaggerated to more clearly show thin component parts. In addition, to more explicitly illustrate physical attributes and features, some battery components and innovative modifications are presented with straight edges, angular corners, and flat surfaces. It is understood by those skilled in the art that present-day manufacturing methods can produce these components with rounded edges, corner fillets, and curved surfaces as desired. Also, the S.A.E. top-terminal batteries and side-terminal batteries shown are merely representative of the various configurations of automobile lead acid batteries in widespread usage, and the illustrations shown are generalized and should not be taken as limiting the application of the present invention. In particular, the disclosed battery charging cable components can be utilized for L-terminal batteries, for stud-terminal batteries, and for combined S.A.E. and stud type batteries.

The present invention provides embossed electrical contact sockets on the surfaces of battery housings which enable positive and negative electrical charging connections to be made to respective battery terminals via electrically conductive traces, without the need for conventional spring-loaded serrated jaw battery clamps. The electrical contact sockets: (i) enable electrically connecting to a battery without causing surface damage to battery terminals or to engine battery clamps, (ii) assure proper polarity between a source battery and a discharged battery, (iii) reduce the possibility of hydrogen gas ignition from electrical sparks at a battery terminal, and (iv) provide for convenient top, side, and front electrical charging connection locations on the battery housing to accommodate different engine compartment layouts and awkward access spaces.

Figure 1:
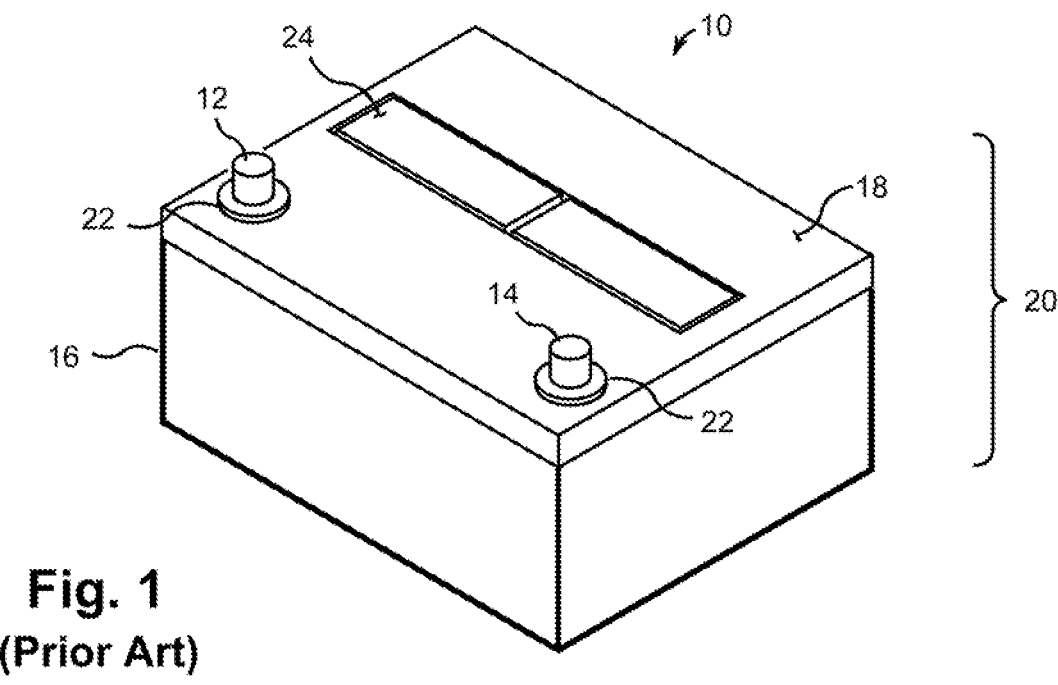
FIG. 1 is a diagrammatical illustration of an automotive lead acid battery showing a battery housing with positive and negative battery terminals on a battery cover, in accordance with the present state of the art.
Figure 2:
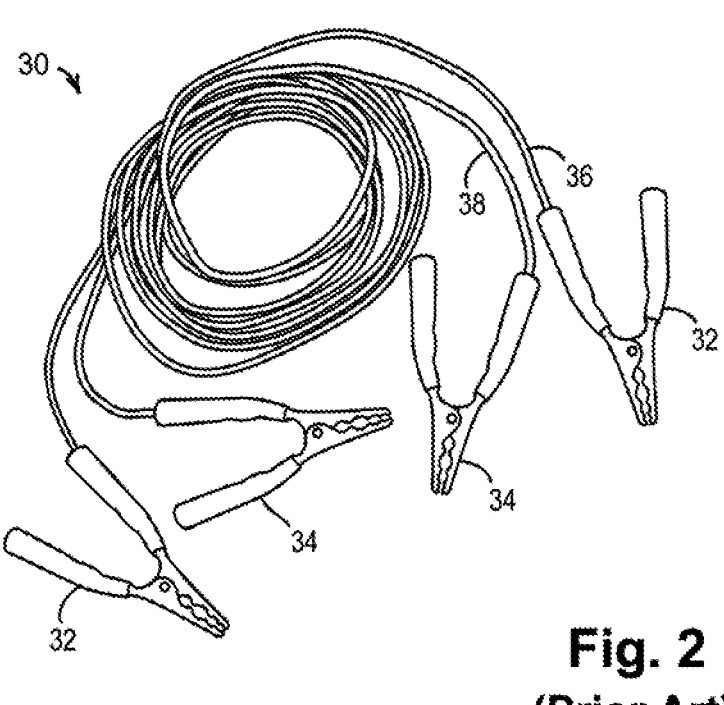
FIG. 2 is a diagrammatical illustration of a conventional booster cable including booster cable clamps connected to opposite ends of a pair of insulated electrical conductors, in accordance with the present state of the art.
Figure 3:
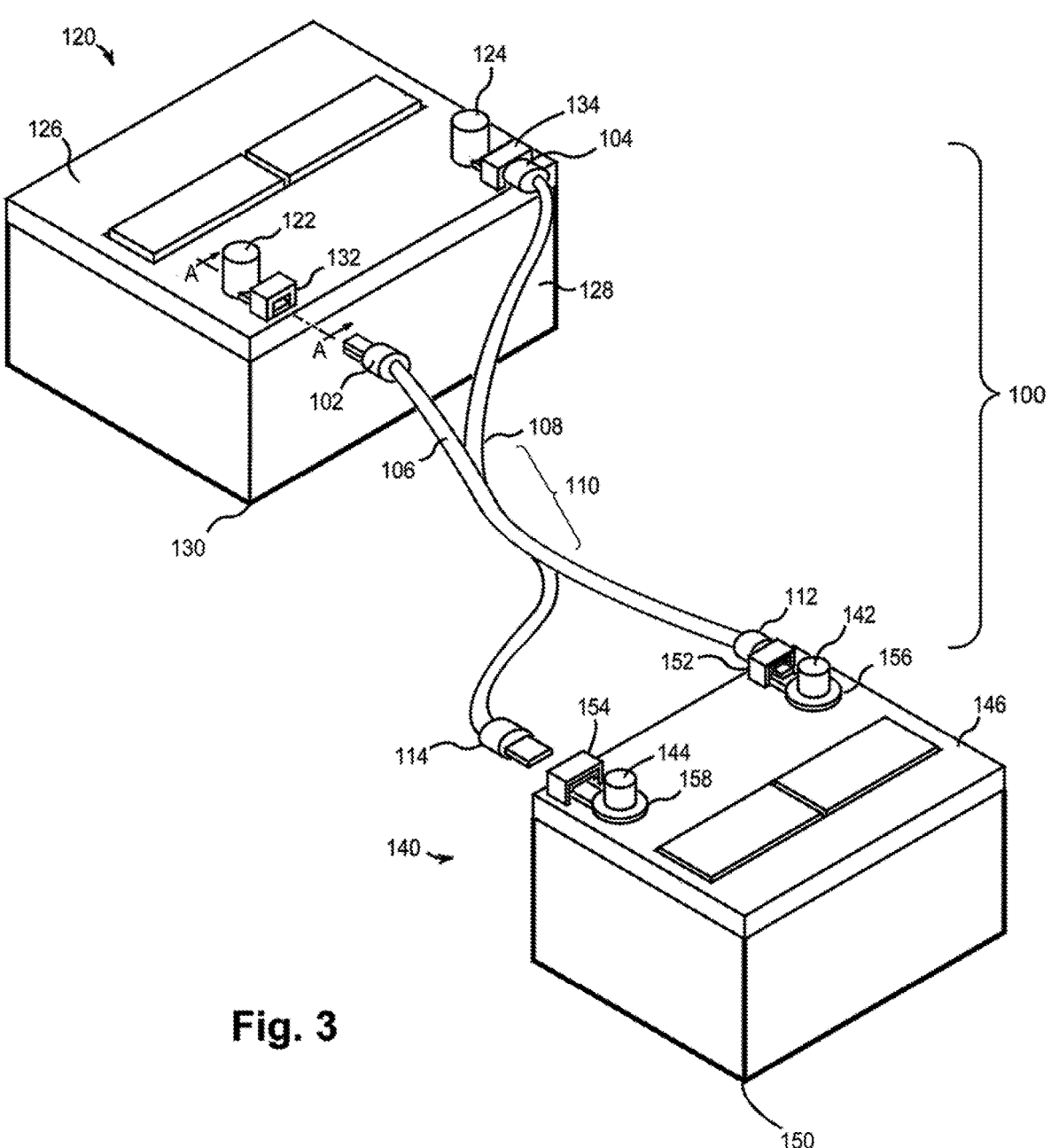
FIG. 3 shows a system and method for mobile battery charging using a battery jumper plug cable inserted into to embossed battery contact sockets on source and load batteries, in accordance with the present invention.

FIG. 3 illustrates a system and method for mobile battery charging in accordance with aspects of the present invention. A novel battery jumper plug cable 100 is used to conduct an electrical charging current provided by a live (i.e., charged) source battery 120 to a depleted (i.e., drained) load battery 140. In this example, both batteries 120, 140 are configured and manufactured in accordance with disclosed features of the present invention. The battery jumper plug cable 100 includes a positive insulated electrical conductor 106 and a negative insulated electrical conductor 108. The insulated electrical conductors 106, 108 each have sufficient cross-sectional areas when used to safely conduct high amperage engine starter current. In an exemplary embodiment, parallel lengths of the positive insulated electrical conductor 106 and the negative insulated electrical conductor 108 may be physically joined at a conductor pair section 110 for convenience in handling and storage of the battery jumper plug cable 100 with minimal tangling. One end of the positive insulated electrical conductor 106 is electrically connected to a positive source jumper plug 102 and the other end is connected to a positive load jumper plug 112. One end of the negative insulated electrical conductor 108 is electrically connected to a negative source jumper plug 104 and the other end is connected to a negative load jumper plug 114.

The source battery 120 includes a positive source battery contact socket 132 embossed, or otherwise attached, to the surface of a source battery cover 126 adjacent to a positive source battery terminal 122. A negative source battery contact socket 134 is embossed, or otherwise attached, to the surface of the source battery cover 126 adjacent to a negative source battery terminal 124. The source battery cover 126 may be bonded to a battery casing 128 to form a battery housing 130. The source battery contact sockets 132, 134 may be individual components formed from electrically insulating (i.e., electrically non-conducting) material, such as a plastic, and then attached to the source battery cover 126 during manufacture. Alternatively, the source battery contact sockets 132, 134 may be fabricated as embossed sockets formed unitary with the source battery cover 126. The load battery 140 includes a positive load battery contact socket 152 on the surface of a load battery cover 146 adjacent to a positive load battery terminal 142, and a negative load battery contact socket 154 adjacent to a negative load battery terminal 144 on the surface of the load battery cover 146. As shown in the illustration, the load battery 140 is a type of battery configured with an optional positive load battery terminal base 156 at the positive load battery terminal 142, and an optional negative load battery terminal base 158 at the negative load battery terminal 144. The load battery contact sockets 152, 154 include electrically insulating material, such as a plastic or other composite material, and may be bonded, thermally attached, or otherwise attached, to the load battery cover 146. The load battery contact sockets 152, 154 can alternatively be fabricated as embossed socket components (i.e., not discrete components) formed unitary with the load battery cover 146.

As can be appreciated by one skilled in the art, the positive source jumper plug 102 and the negative source jumper plug 104 are preferably components making up a polarized source connector pair. In the charging configuration shown, a user can electrically connect the battery jumper plug cable 100 to the source battery 120 by inserting the positive source jumper plug 102 into the designated positive source battery contact socket 132 in the direction of the positive source battery terminal 122, and inserting the negative source jumper plug 104 into the designated negative source battery contact socket 134 in the direction of the negative source battery terminal 124. Using the battery jumper plug cable 100, the user can complete the electrical connection of the source battery 120 to the load battery 140 by inserting the positive load jumper plug 112 into the designated positive load battery contact socket 152 and inserting the negative load jumper plug 114 into the designated negative load battery contact socket 154. The positive load jumper plug 112 and the negative load jumper plug 114 make up a polarized load connector pair. Accordingly, the user is unlikely to inadvertently connect the load battery 140 to the source battery 120.

Figure 4:
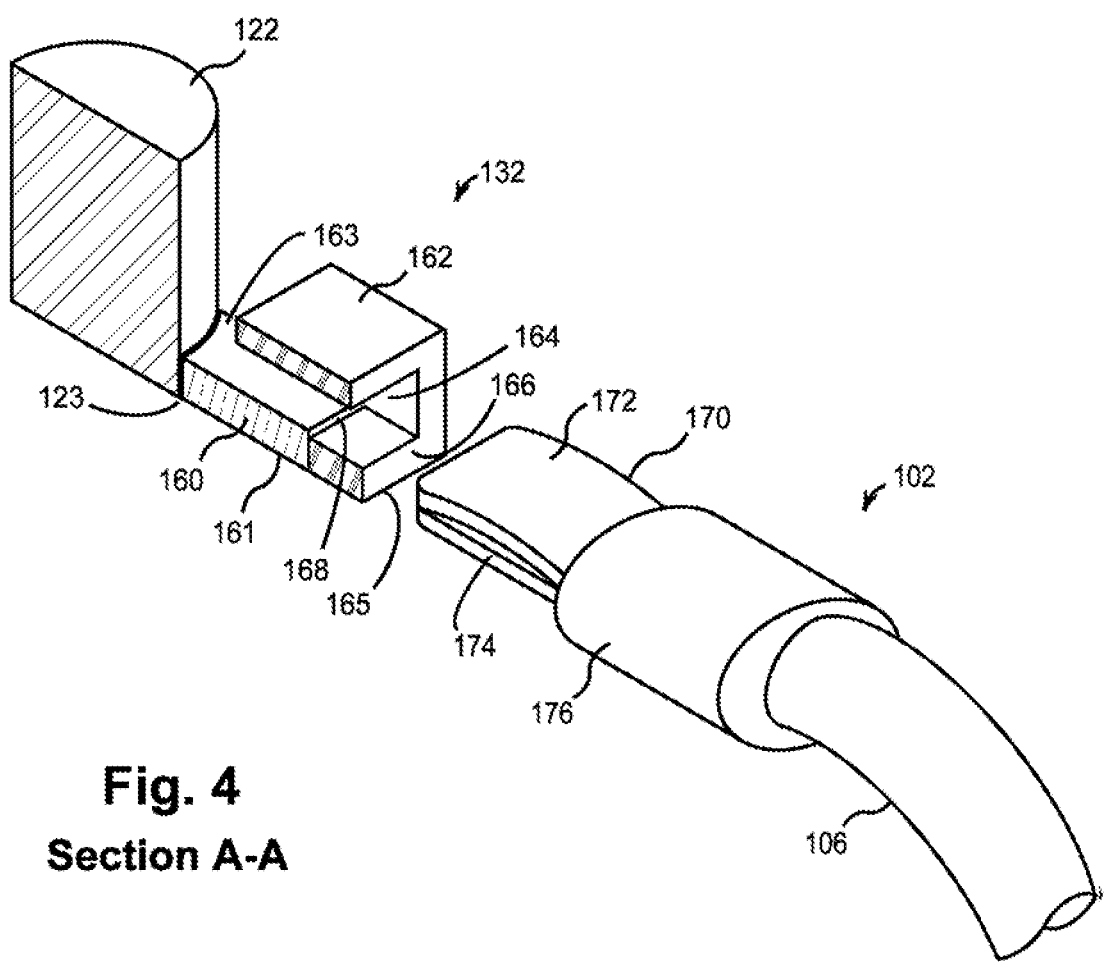
FIG. 4 is an isometric detail sectional view of the positive source battery contact socket and the positive source battery terminal shown in FIG. 3.

FIG. 4 is an isometric detail sectional view A-A of the positive source battery contact socket 132 and the positive source battery terminal 122, as defined by section plane A-A in FIG. 3. As seen in the view of FIG. 4, the positive source battery contact socket 132 includes a positive electrically conductive trace 160, a positive socket shell 162, and a socket shell sill 166 defining a positive socket shell slot 164. The positive socket shell slot 164 is substantially a rectangular parallelepiped slot opening extending through the positive socket shell 162. The positive source battery contact socket 132 is an electrical insulator and may be fabricated from an electrically non-conductive material such as a plastic or a plastic composite. One end of the positive socket electrically conductive trace 160 includes a prong contact trace 161, that is, a trace segment lying at least partially within the positive socket shell 162, and a second end of the positive socket electrically conductive trace 160 includes a terminal contact trace 163 electrically connected to the positive source battery terminal 122. The entire length of the metal or metal alloy strip forming the positive socket electrically conductive trace 160 has a sufficient cross-sectional area to safely conduct high amperage engine starter current. In an alternative embodiment (not shown), the positive socket shell slot 164 can be configured as an internal slot or closed cavity (not shown), open only at the socket shell sill 162, with the positive socket shell slot 164 extending to expose at least part of the prong contact trace 161 to an electrical plug prong. See, for example, the configuration of a positive socket shell slot 376, shown in FIG. 17, below.

In an exemplary embodiment, the positive source battery contact socket 132, including the positive socket electrically conductive trace 160, may be thermally bonded or chemically bonded to the surface of the source battery cover 126 (see FIG. 3). The positive socket electrically conductive trace 160 extends from the socket shell sill 166 and is electrically connected to the positive source battery terminal 122, such as by a conductive epoxy 123 or by a solder composition (not shown). The positive socket electrically conductive trace 160 can be fabricated from a copper alloy, or can be a lead alloy manufactured as a unitary element making up the positive source battery terminal 122. The thickness of the positive socket electrically conductive trace 160 is preferably greater than the thickness of the socket shell sill 166, resulting in a relatively small trace sill offset 168. The negative source battery contact socket 134 (shown in FIG. 3) is similarly configured, but differs from the positive source battery contact socket 132 in that the aspect ratio of a negative source shell slot differs from the aspect ratio of the positive socket shell slot 164, to assure electrical polarity.

The positive source jumper plug 102 includes a substantially rectangular parallelepiped positive source plug prong 170 formed from a curved prong blade 172 and a substantially congruent curved, or flat, prong blade 174. Each prong blade 172, 174 is fabricated from an electrically conductive material, such as a copper alloy. The curved prong blade 172 provides a spring-like action against the flat prong blade 174. This spring action increases contact friction between the positive source plug prong 170 and the positive socket electrically conductive trace 160, and thus functions to removably retain the inserted positive source plug prong 170 inside the positive socket shell slot 164. The trace sill offset 168 serves to ensure that the positive source plug prong 170 makes optimal electrical contact with the positive socket electrically conductive trace 160 when inserted into the positive source battery contact socket 132, either in the orientation shown or with the curved prong blade 172 against the positive socket electrically conductive trace 160. The positive source plug prong 170 is electrically connected to the positive insulated electrical conductor 106 inside an electrically non-conductive positive jumper plug grip 176 to form the positive source jumper plug 102. The negative source jumper plug 104 (shown in FIG. 3) is similarly configured.

Figure 5:
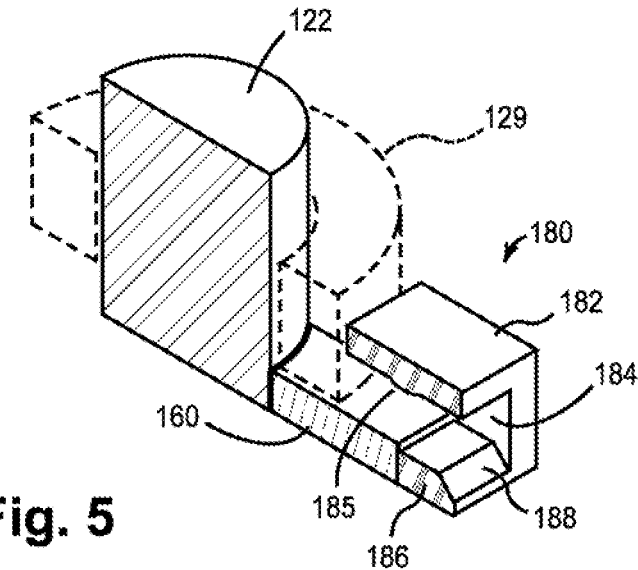
FIG. 5 is an isometric sectional detail view of a positive battery dimple contact socket that includes a positive socket electrically conductive trace, a positive socket shell, and a socket shell sill, in accordance with the present invention.

FIG. 5 is an isometric sectional detail view of an alternatively configured positive battery dimple contact socket 180 that includes the positive socket electrically conductive trace 160, a positive socket shell 182, and a socket shell sill 186 defining a positive socket shell slot 184. With additional reference to FIG. 4, it can be seen that the positive battery dimple contact socket 180 is similar to the positive source battery contact socket 132 except that the positive battery dimple contact socket 180 also includes a shell sill bevel 188 provided to facilitate insertion of the positive source jumper plug 102, and the positive socket shell 182 includes a socket shell dimple 185 protruding into the positive socket shell slot 184. The socket shell dimple 185 increases the force of the positive source plug prong 170 applied against the positive socket electrically conductive trace 160, which is attached to the surface of a battery housing (not shown), when the positive source plug prong 170 is inserted into the positive socket shell slot 184, thus minimizing electrical contact resistance and improving retention of the positive source plug prong 170 in the positive socket shell slot 184. It should be understood that the particular design configurations of the battery contact sockets and electrically conductive traces disclosed in accordance with the present invention provide space for attachment of a conventional engine battery clamp 129 (shown in phantom) onto the positive source battery terminal 122.

Figure 6:
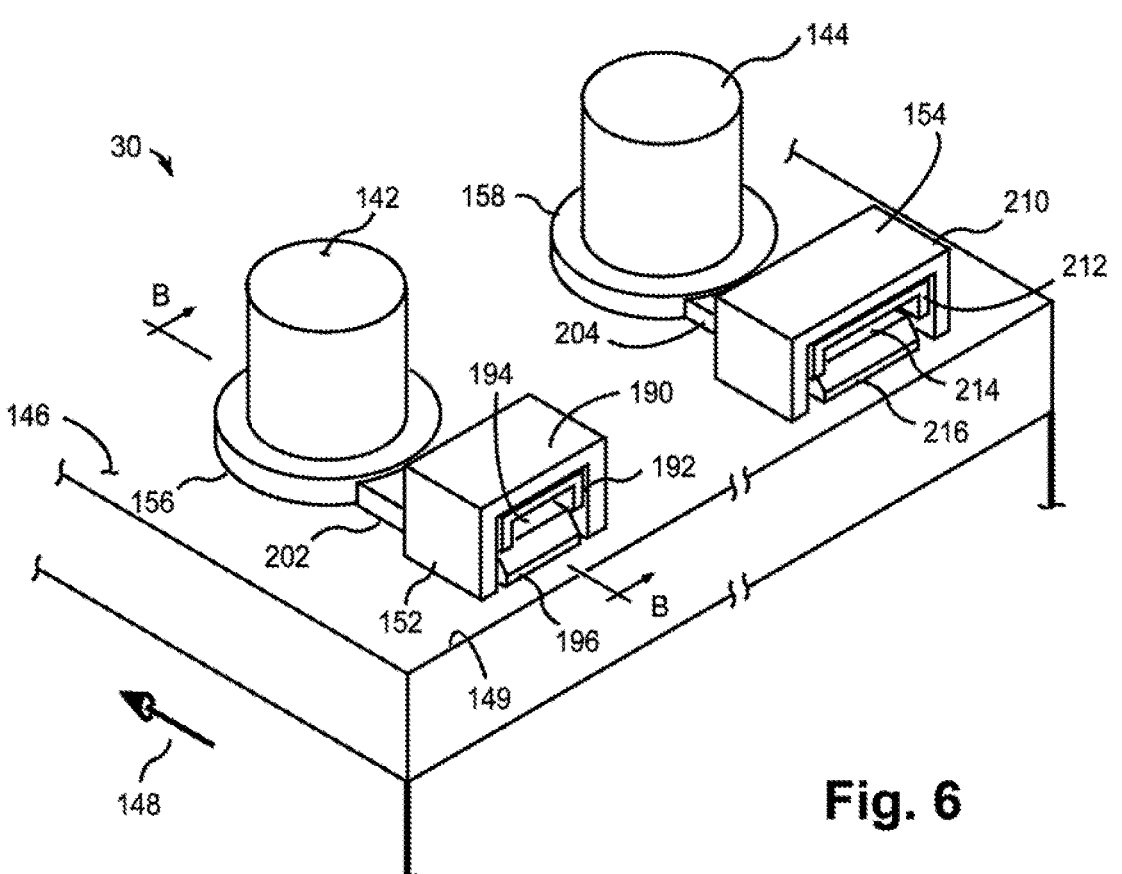
FIG. 6 is an isometric view of a load battery including a positive load battery terminal, a negative load battery terminal, a positive load battery contact socket, and a negative load battery contact socket, in accordance with the present invention.

FIG. 6 is an isometric view of the load battery 140 showing the positive load battery terminal 142, the negative load battery terminal 144, with the positive load battery contact socket 152 and the negative load battery contact socket 154 attached to the surface of the load battery cover 146. The positive load battery terminal base 156 encloses the positive load battery terminal 142, and the negative load battery terminal base 158 encloses the negative load battery terminal 144. The positive load battery contact socket 152 includes a positive battery socket shell 190, configured as an inverted U-shaped channel, enclosing a positive prong retention insert 192. A positive socket shell slot 194 is provided between the positive prong retention insert 192 and a positive socket shell sill 196. A positive source socket electrically conductive trace 202 is attached to surface of the load battery cover 146 between the positive load battery terminal 142 and the positive socket shell sill 196. The positive source socket electrically conductive trace 202 may be fabricated from an electrically conductive material such as, for example, a copper alloy, or from the same material as the positive load battery terminal 142. Accordingly, the positive source socket electrically conductive trace 202 has a sufficiently large cross-sectional area to safely conduct the level of electrical current supplied by the source battery 120 (shown in FIG. 3).

The negative load battery contact socket 154 includes a negative battery socket shell 210, configured as an inverted U-shaped channel, enclosing a negative prong retention insert 212. A negative socket shell slot 214 is formed between the negative prong retention insert 212 and a negative socket shell sill 216. A negative socket electrically conductive trace 204 is attached to the surface of the load battery cover 146 between the negative load battery terminal 144 and the negative socket shell sill 216. The negative load battery contact socket 154 is similar to the positive load battery socket 152 except that, in the configuration shown, the width of the negative socket shell slot 214 is greater than the width of the positive socket shell slot 194, and the height of the negative socket shell slot 214 is smaller than the height of the positive socket shell slot 194. That is, the negative socket shell slot 214 has a larger aspect ratio than the positive socket shell slot 194. Generally, the aspect ratio of a negative socket shell slot is different from the aspect ratio of a positive socket shell slot to provide polarization. Note that both the positive socket shell slot 194 and the negative socket shell slot 214 open towards a load battery cover front edge 149. Accordingly, insertion of the load jumper plugs 112, 114 (see FIG. 3) into the respective load battery sockets 152, 154 will be in the direction of a load battery longitudinal axis 148.

Figure 7:
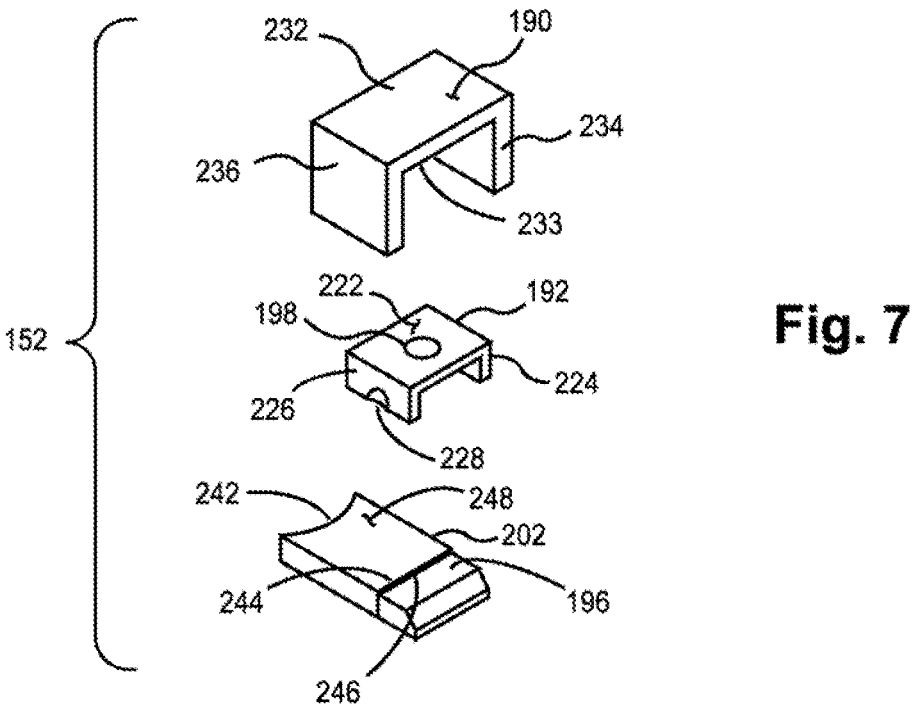
FIG. 7 is an exploded isometric view of the positive load battery contact socket of FIG. 6, being an assembly of a positive battery socket shell, a positive prong retention insert, a socket shell sill, and a positive socket electrically conductive trace.

FIG. 7 is an exploded isometric view of the positive load battery contact socket 152, which includes the positive battery socket shell 190, the positive prong retention insert 192, the positive socket shell sill 196, and the positive socket electrically conductive trace 202. In the particular configuration shown, the positive prong retention insert 192 is an elastic plastic or metal inverted U-shaped channel, sized and shaped to be attached to a shell insert support surface 233 of the positive battery socket shell 190. This method of attachment can make use of a mechanical fastener or a chemical bonding agent, as is well known in the relevant art. The positive prong retention insert 192 includes a substantially planar insert top cap 222 with a first insert flange 224 and a second insert flange 226. A side indent 228 may be provided in either or both insert flanges 224, 226. The side indent 228 functions to frictionally retain the positive load jumper plug 112 (see FIG. 3), when inserted into the positive load battery contact socket 152.

The positive battery socket shell 190 is configured as an essentially inverted U-shaped channel with a planar socket shell top 232, a first socket shell side 234, and a second socket shell side 236. The positive battery socket shell 190 is preferably fabricated from an electrically non-conductive material such as a plastic or a plastic composite and is thermally bonded or chemically bonded to the load battery cover 146 (shown in FIG. 3). In an exemplary embodiment, the positive battery socket shell 190 and the socket shell sill 196 may be formed as part of the load battery cover 146, and may be fabricated from the same material used for the load battery cover 146.

As seen in FIG. 7, the positive socket electrically conductive trace 202 has a terminal contact end 242 (i.e., a first end), which may be curved, and a socket sill end 244 (i.e., a second end), which may be straight. The thickness of the positive socket shell sill 196 is smaller than the thickness of the positive socket electrically conductive trace 202 so as to form a trace sill offset 246. An insert cap dimple 198 in the insert top cap 222 functions to urge the inserted positive load jumper plug 112 (see FIG. 3) against an electrically conductive trace contact surface 248.

Figure 8:
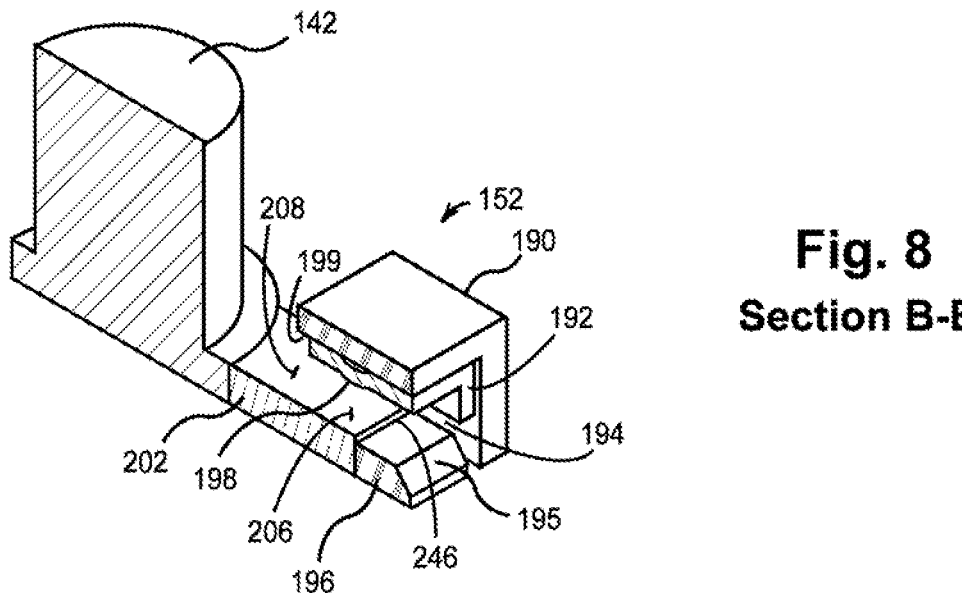
FIG. 8 is an isometric cross-sectional detail view of the positive load battery contact socket and the positive load battery terminal of FIG. 6.

FIG. 8 is an isometric cross-sectional detail view B-B of the positive load battery contact socket 152 and the positive load battery terminal 142, as defined by section plane B-B in FIG. 6, above. For clarity of illustration in FIG. 8, the relative thicknesses of the positive battery socket shell 190, the positive prong retention insert 192, the socket shell sill 196, and the positive socket electrically conductive trace 202, have been exaggerated to allow cross-sectional hatch lines to be more easily seen. In the configuration shown, the positive socket shell sill 196 includes a socket sill bevel 195. It can be appreciated that the insert cap dimple 198 protrudes below an insert cap undersurface 199 of the positive prong retention insert 192, and into the positive socket shell slot 194. A trace sill offset 246 ensures that the inserted positive load jumper plug 112 (see FIG. 9) makes reliable contact with the positive socket electrically conductive trace 202. The positive socket electrically conductive trace 202 includes a prong contact trace 206 lying within the positive battery socket shell 190, and a terminal contact trace 208 electrically connected to the positive load battery terminal 142.

Figure 9:
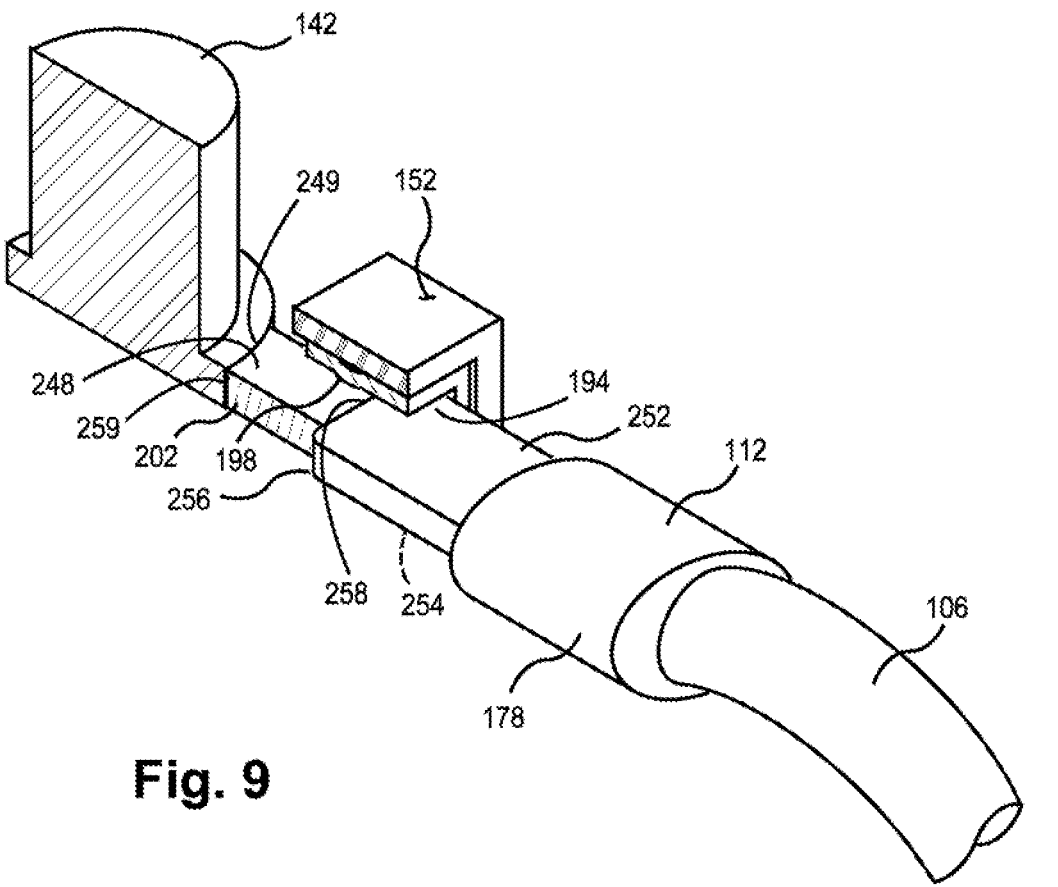
FIG. 9 shows an insertion of a positive load jumper electrical plug into a positive socket shell slot in the positive load battery contact socket of FIG. 8.

FIG. 9 shows an insertion of the positive load jumper plug 112 into the positive socket shell slot 194 in the positive load battery contact socket 152. The positive load jumper plug 112 includes a positive electrical prong 252 electrically connected to the positive insulated electrical conductor 106 inside an electrically nonconductive jumper plug grip 178. In the exemplary embodiment shown, the positive electrical prong 252 is a substantially planar parallelepiped-shaped component, having a substantially rectangular cross section, and is made from an electrically conductive material, such as a copper alloy. There may be a rounded prong corner 256 proximate a positive prong leading edge 258 to aid the insertion of the positive electrical prong 252 into the positive socket shell slot 194.

When inserted, a positive electrical prong contact surface 254 (not visible), that is, the underside surface of the positive electrical prong 252, makes electrical contact with an electrically conductive trace contact surface 238 to complete an electrically conductive path between the positive insulated electrical conductor 106 and the positive load battery terminal 142. It can be appreciated that, when the positive prong leading edge 258 has been inserted beyond the insert cap dimple 198, the positive electrical prong contact surface 254 is urged against the electrically conductive trace contact surface 248 by the insert cap dimple 198 so as to maximize the electrical current conduction between the positive electrical prong 252 and the positive socket electrically conductive trace 202. This urging action is also provided when the positive electrical prong 252 is inserted into the positive socket shell slot 184 of the positive battery dimple contact socket 180, shown in FIG. 5.

A terminal contact end 249 is electrically connected to the positive load battery terminal 142, which connection may be achieved by using a conductive epoxy (not shown) or a solder (not shown) at a terminal-trace interface 259. If desired, the battery manufacturer may rely on simple proximal contact at the terminal-trace interface 259 to achieve an electrical charging path. However, this is not a preferred design as, over time, engine vibration will introduce gaps, and ambient dirt will contaminate the terminal-trace interface 259, resulting in increased contact resistance. Preferably, the positive socket electrically conductive trace 202 is fabricated as part of the positive load battery terminal 142 to form a unitary terminal/trace component without the physical terminal-trace interface 259.

Figures 10, 11, 12:
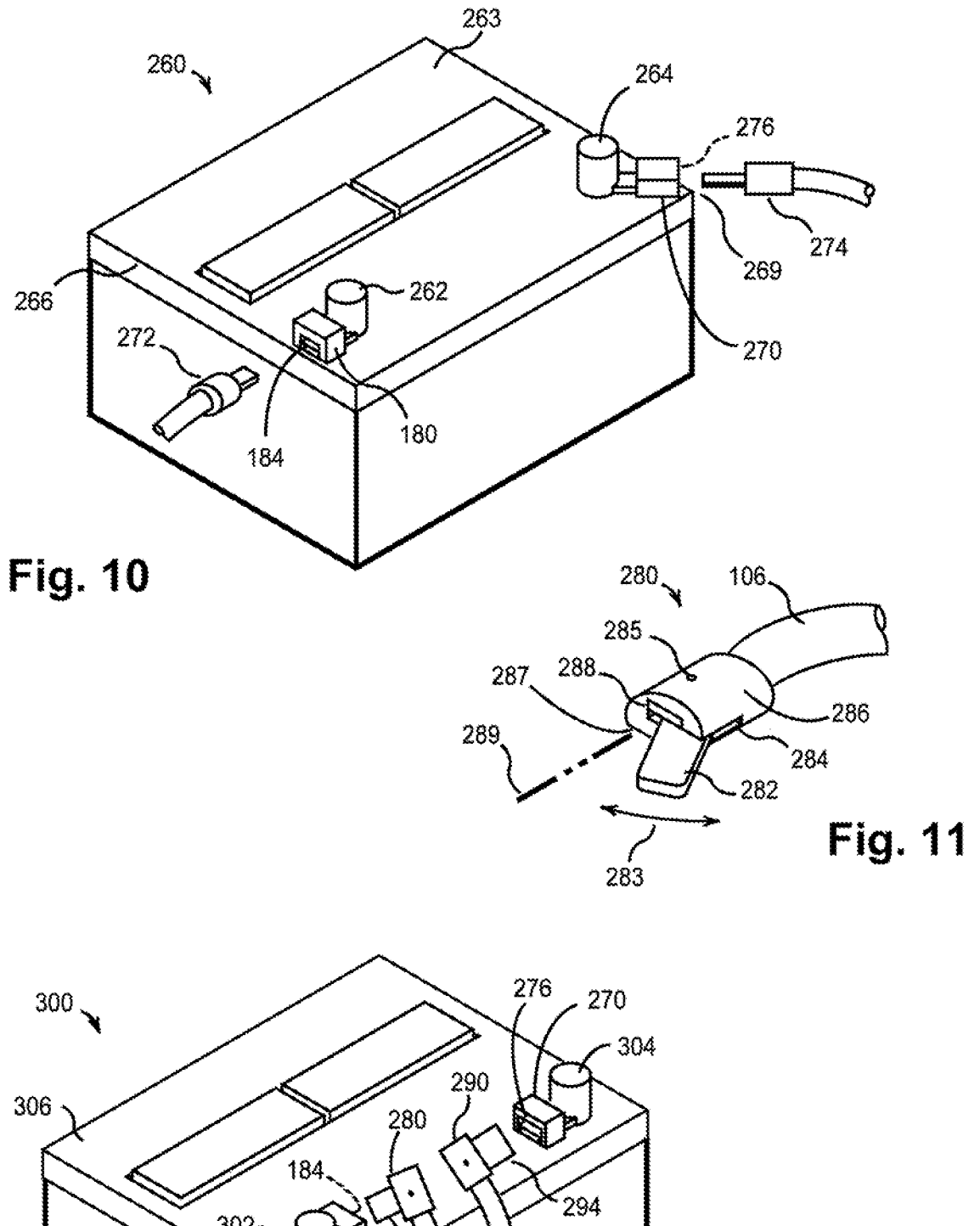
FIG. 10 is a battery with: (i) a positive battery dimple contact socket secured to a battery cover between a battery cover side edge and a positive battery terminal, and (ii) a negative battery dimple contact socket secured to the battery cover between a battery cover corner and a negative battery terminal, in accordance with the present invention.
FIG. 11 shows a positive convertible jumper plug that includes a positive plug swivel prong rotatably secured to a swivel pin, and electrically attached to a positive insulated electrical conductor, in accordance with the present invention.
FIG. 12 shows a battery with a positive battery terminal, a negative battery terminal, and two corresponding embossed battery contact sockets on the cover of a battery, in accordance with the present invention.

The present invention provides alternative battery contact socket configurations and arrangements to accommodate battery charging operations in a variety of automobile engine compartment layouts. For example, there is shown in FIG. 10 a battery 260 with the positive battery dimple contact socket 180 secured to a surface of a battery cover 263 between a battery cover side edge 266 and a positive battery terminal 262. A positive jumper plug 272 may be inserted into the positive socket shell slot 184 by a motion in the direction of the positive battery terminal 262. A negative battery dimple contact socket 270 is secured to the surface of the battery cover 263 between a battery cover corner 269 and a negative battery terminal 264. Insertion of a negative jumper plug 274 into a negative socket shell slot 276 is made in a direction toward the negative battery terminal 264. It can be appreciated that the battery 260 may find application in an engine compartment geometry that might not allow a user to easily insert the jumper plugs 102, 104 into the respective source battery contact sockets 132, 134 if the source battery 120 were installed (see FIG. 3).

FIG. 11 shows a positive convertible jumper plug 280 that is electrically attached to the positive insulated electrical conductor 106. The positive convertible jumper plug 280 includes a positive plug swivel prong 282 that is rotatably secured to a swivel pin 285, thus allowing the positive plug swivel prong 282 to be rotated within a corner slot 284 in a convertible jumper plug grip 286, as indicated by arrow 283. The positive plug swivel prong 282 maintains electrical contact with an internal conductor 288 within the convertible jumper plug grip 286 as the positive plug swivel prong 282 converts from, for example, a straight configuration (i.e., in line with a plug axis 289) to a right-angle configuration (i.e., perpendicular to the plug axis 289). The positive convertible jumper plug 280 includes a grip flat base 287 on the convertible jumper plug grip 286 to provide additional clearance between the convertible jumper plug grip 286 and a battery surface (not shown) for the fingers of a user. Preferably, the convertible jumper plug grip 286 includes internal detents (not shown) to maintain the positive plug swivel prong 282 in either the straight configuration or in the right-angle configuration, as desired by a user. The internal conductor 288 is electrically connected to the positive insulated electrical conductor 106 via the swivel pin 285, thus maintaining the positive plug swivel prong 282 in permanent electrical contact with the positive insulated electrical conductor 106. In an exemplary embodiment, the positive plug swivel prong 282 is dimensionally similar to the positive electrical prong 252, shown in FIG. 9.

FIG. 12 shows a battery 300 with a positive battery terminal 302, a negative battery terminal 304, and two corresponding embossed battery contact sockets 180, 270 attached to a surface of a battery cover 306. The positive battery dimple contact socket 180 is located on the battery cover 306 between the positive battery terminal 302 and the negative battery terminal 304, adjacent to the positive battery terminal 302 with the positive socket shell slot 184 facing the negative battery terminal 304. The negative battery dimple contact socket 270 is located on the surface of the battery cover 306 between the negative battery terminal 304 and the positive battery terminal 302, adjacent to the negative battery terminal 304 with the negative socket shell slot 276 facing the positive battery terminal 302. The opposing orientations and close proximities of the battery dimple contact sockets 180, 270 benefit from the use of convertible jumper plugs 280, 290.

The positive plug swivel prong 282 has been placed into a right-angle configuration, aligned for insertion into the positive battery dimple contact socket 180. It should be understood that the positive plug swivel prong 282 is dimensionally sized to be inserted into the positive socket shell slot 184. The negative convertible jumper plug 290 (electrically attached to the negative insulated electrical conductor 108) has a negative plug swivel prong 294 placed into a right-angle configuration, aligned for insertion into the negative battery dimple contact socket 270. The negative convertible jumper plug 290 is similar to the positive convertible jumper plug 280 except that the negative plug swivel prong 294 is dimensionally sized to be inserted into the negative socket shell slot 276. Accordingly, the convertible jumper plugs 280, 290 make up a polarized plug pair. It should be understood that the negative battery dimple contact socket 270 is similar to the positive battery dimple contact socket 180 except that the aspect ratio of the negative socket shell slot 276 is greater than the aspect ratio of the positive socket shell slot 184.

It should be understood that other configurations of battery contact sockets and jumper plugs may be disclosed within the scope of the present invention. For example, FIG. 13 is an isometric detail sectional view of a canted positive battery contact socket 310 configured for attachment to a surface of a battery housing (not shown) and electrical connection to a positive battery terminal 342. The canted positive battery contact socket 310 has a substantially wedge-shaped positive battery socket shell 312 with a beveled socket shell sill 314 defining a positive socket shell slot 316. A socket shell dimple 317 is provided to frictionally retain an inserted plug prong (not shown) in the positive socket shell slot 316. The canted positive battery contact socket 310 is supported on a planar socket shell base 326. A socket longitudinal axis 318 is canted (i.e., inclined) with respect to the planar socket shell base 326, as indicated by an angle 323.

The canted positive battery contact socket 310 includes a positive socket angled electrically conductive trace 320 that includes an essentially planar terminal contact trace 324 extending from an essentially planar prong contact trace 322. The terminal contact trace 324, at a first end, forming an obtuse angle with the prong contact trace 322, at a second end. such that the terminal contact trace 324 lies in the same plane as the planar socket shell base 326, and the prong contact trace 322 is substantially parallel to the socket longitudinal axis 318. This configuration advantageously allows for placement of the canted positive battery contact socket 310 onto a battery surface region where insertion of a mating electrical connector requires finger clearance between the grip of the mating electrical connector (not shown) and the surface of the battery, such as required for the battery 340 shown in FIG. 15 below.

FIG. 14 shows a positive retractable jumper plug 330 that includes a positive plug retractable prong 332 that can be retracted into a jumper plug grip 336 when not in use. A user can slide a prong retraction button 334, as indicated by arrow 333, to prevent accidental shortening of the positive plug retractable prong 332. A fixed conductor 338, inside the jumper plug grip 336, functions to maintain the positive plug retractable prong in permanent electrical contact with the positive insulated electrical conductor 106.

FIG. 15 shows a battery 340 with the canted positive battery contact socket 310 electrically attached to the positive battery terminal 342, and a canted negative battery contact socket 350 electrically attached to a negative battery terminal 344. The canted negative battery contact socket 350 is similar to the canted positive battery contact socket 310 in that the canted negative battery contact socket 350 includes a substantially wedge-shaped negative battery socket shell 352 with an inclined negative socket shell slot 356. The canted negative battery contact socket 350 differs from the canted positive battery contact socket 310 in that the negative socket shell slot 356 has an aspect ratio different from that of the canted positive socket shell slot 316

As seen in the exemplary embodiment of the battery 340, the canted positive battery contact socket 310 is secured to a battery cover 346 between the positive battery terminal 342 and the negative battery terminal 344. This position can provide necessary clearance for the fingers of a user when inserting the positive retractable jumper plug 330 into the positive socket shell slot 316. Similar clearance is provided for the canted negative battery contact socket 350 at the negative battery terminal 344.

FIG. 16 is a cross-sectional isometric view of a compact negative battery contact socket 360 configured for use on the surface of a battery housing (not shown) in confined quarters where the canted positive battery contact socket 310 (see FIG. 13) may not be suitable. The compact negative battery contact socket 360 includes a negative battery socket shell 362 with a negative socket inclined slot 366 adjacent a socket shell sill 364. One end of a negative socket angled electrically conductive trace 368, in the compact negative battery contact socket 360, is electrically connected to a negative battery terminal 384. An electrical prong inserted into the negative socket inclined slot 366 will thus make electrical contact with: (i) a prong contact trace 367, which is at least partially secured within the negative socket inclined slot 366, (ii) a terminal contact trace 369 connected to the prong contact trace 367, and oriented at an obtuse angle to the prong contact trace 367, and (iii) the negative battery terminal which is in electrical contact with the terminal contact trace 369.

An battery contact socket configured for use on a battery that is even more compact than the compact negative battery contact socket 360 of FIG. 16 is a mini positive battery contact socket 370 shown (in cross section) in FIG. 17. The mini positive battery contact socket 370 is shown to be electrically connected to a positive battery terminal 382 by a positive socket angled electrically conductive trace 378. As seen in the illustration, the positive socket angled electrically conductive trace 378 includes a prong contact trace 377, secured within the positive socket shell slot 376, and forming a substantially right angle with a terminal contact trace 379. A positive battery socket shell 372 includes the positive socket shell slot 376 adjacent a socket shell sill 374. A jumper plug (not shown) inserted into the positive socket shell slot 376 to make electrical contact with one end of the positive socket angled electrically conductive trace 378 would thus be retained generally perpendicular to a battery housing surface (not shown), and may thus reduce the engine compartment space needed to access an electrical connection to the positive battery terminal 382. As can be seen, the positive socket shell slot 376 does not extend through the mini positive battery contact socket 370, but rather forms an internal slot, or a closed cavity.

FIG. 18 shows a battery 380 with the positive battery terminal 382 and the negative battery terminal 384 disposed on a surface of a battery cover 386. In the configuration shown, the compact negative battery contact socket 360 and the mini positive battery contact socket 370 are secured to the battery cover 386. The positive retractable jumper plug 330 is positioned for insertion into the positive socket shell slot 376 for electrically connecting the positive insulated electrical conductor 106 to the positive battery terminal 382. A negative retractable jumper plug 390 is positioned for insertion into the negative socket inclined slot 366 for electrically connecting the negative insulated electrical conductor 108 to the negative battery terminal 384. The negative retractable jumper plug 390 is similar to the positive retractable jumper plug 330 except that a negative plug retractable prong 392 has a different aspect ratio from the positive plug retractable prong 332, to maintain electrical polarity.

Figure 19:
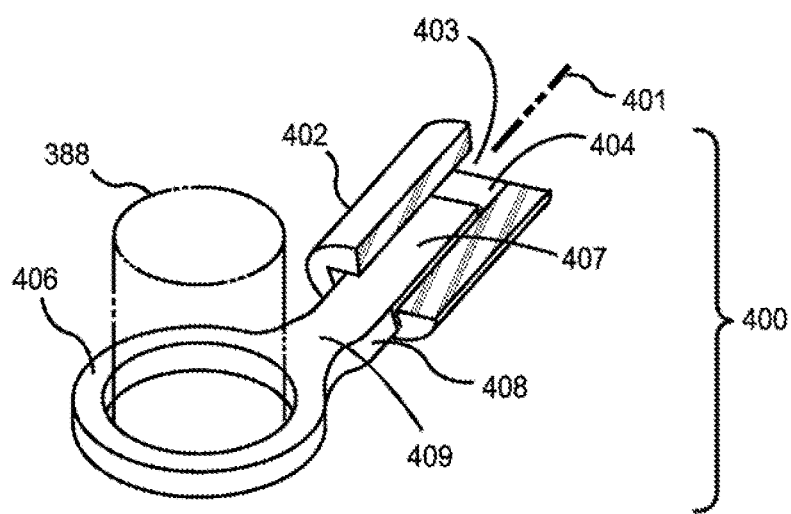
FIG. 19 is a portable positive battery lug contact socket emplaced onto a positive battery terminal, in accordance with the present invention.

It can be appreciated that conventional automotive batteries will remain commonplace and will require some time to be phased out in favor of batteries that incorporate the electrical connector battery contact sockets disclosed in the present specification. Be that as it may, user-emplaced battery contact sockets, in accordance with the present invention, can be incorporated on unmodified conventional automotive batteries so as to allow use of the battery jumper plug cable 100 of FIG. 3 in jump starting applications. FIG. 19 shows an interchangeable positive battery lug contact socket 400 emplaced onto a positive battery terminal 388. The interchangeable positive battery lug contact socket 400 can be removed from one battery and installed on another battery, since the positive battery lug contact socket 400 is removably attached to any battery terminal. By using the positive battery lug contact socket 400, and a similar negative battery lug contact slot (not shown). a user can modify and update his conventional automotive battery to utilize the novel battery jumper plug cable 100 shown in FIG. 3, above.

The positive battery terminal 388 is shown in phantom and represents a typical cylindrical battery terminal. The positive battery lug contact socket 400 includes a substantially cylindrical positive battery socket shell 402 made of an electrically insulating material, such as a plastic or composite, for example. The positive battery socket shell 402 has a positive socket shell slot 403, substantially rectangular in cross sectional shape, and extending through the positive battery socket shell 402 along a shell longitudinal axis 401. The positive socket shell slot 403 is sized and configured for insertion and retention of an electrical prong such as, for example, the positive electrical prong 252 (shown in FIG. 9), the positive plug swivel prong 282 (shown in FIG. 11), and the positive plug retractable prong 332 (shown in FIG. 14). It can be appreciated that the aspect ratio of a negative socket shell slot (not shown) differs from the aspect ratio of the positive socket shell slot 403 so as to provide electrical connector polarity. The view of the positive battery socket shell 402 is partially sectioned to more clearly show an angled positive lug socket electrically conductive trace 408 secured in the positive battery socket shell 402, parallel to the positive socket shell slot 403, and terminating at a socket shell sill 404.

The positive lug socket electrically conductive trace 408 includes a prong contact trace 407 secured within the positive battery socket shell 402, and a terminal contact trace 409 extending from the socket shell sill 403. In the configuration shown, the positive socket shell slot 403 may extend substantially the entire length of the prong contact trace 407. Alternatively, the positive socket shell slot 403 may be shorter than the length of the positive battery socket shell 402 such that the positive battery socket shell 402 has a closed end at the terminal contact trace 409. The prong contact trace 407 forms an obtuse angle with the terminal contact trace 409 so as to provide clearance between the socket shell sill 404 and the surface of an adjacent battery housing surface (not shown). The terminal contact trace 409 includes a substantially planar terminal contact lug ring 406 that is placed over the positive battery terminal 388. The positive battery socket shell 402 is thus not attached to a battery surface (not shown), thus making the positive battery lug contact socket 400 an interchangeable battery charging component. The positive battery lug contact socket 400 can be removably retained in electrical contact with the positive battery terminal 388 by an engine battery clamp, such as the engine battery clamp 129 shown above in FIG. 5.

Figure 20:
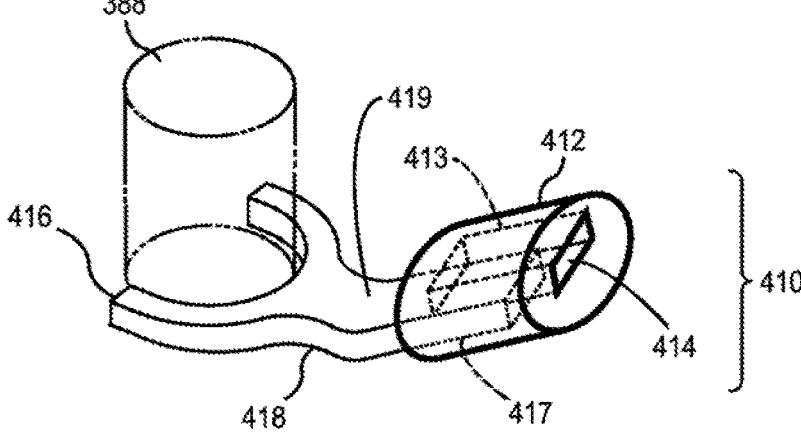
FIG. 20 is a positive battery spade contact socket having a cylindrical positive battery socket shell with a positive socket shell slot extending through the positive battery socket shell, in accordance with the present invention.

Another configuration of an interchangeable battery contact socket is a positive battery spade contact socket 410, with the positive battery terminal 388 in phantom, shown in FIG. 20. The positive battery spade contact socket 410 includes a substantially cylindrical positive battery socket shell 412 with a positive socket shell slot 413, substantially rectangular in cross sectional shape, and extending entirely through the positive battery socket shell 412. An angled positive lug socket electrically conductive trace 418 includes a prong contact trace 417 (hidden), secured within the positive battery socket shell 412, and a terminal contact trace 419 extending from the socket shell sill 414 to the positive battery terminal 388. In the configuration shown, the positive socket shell slot 413 extends along part of length of the prong contact trace 417. The positive socket shell slot 413 may be a through hole as shown, or an internal slot (not shown) without an opening in the positive battery socket shell 412 near the terminal contact trace 419. The prong contact trace 417 preferably forms an obtuse angle with the terminal contact trace 419 so as to provide finger clearance between the socket shell sill 414 and the surface of an adjacent battery housing surface (not shown). The terminal contact trace 419 includes at least one substantially planar terminal contact spade leg 416 partially enclosing the positive battery terminal 388, and may include two terminal contact spade legs 416, as shown in the illustration. Accordingly, the positive battery spade contact socket 410 can be removably retained in electrical contact with the positive battery terminal 388 by an engine battery clamp (not shown).

Figure 21:
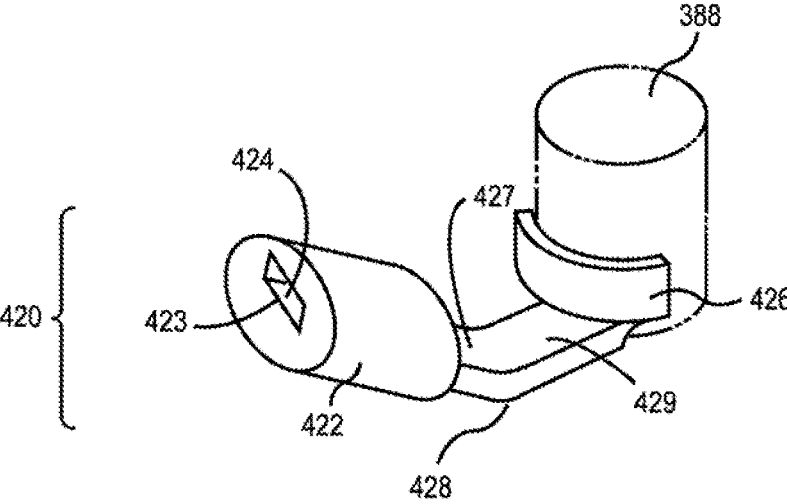
FIG. 21 is a positive battery tab contact socket having a cylindrical positive battery socket shell with a positive socket shell slot extending into the positive battery socket shell, in accordance with the present invention.

Yet another configuration of an interchangeable battery contact socket is a positive battery tab contact socket 420, shown in FIG. 21. The positive battery tab contact socket 420 includes a substantially cylindrical positive battery socket shell 422 with a positive socket shell slot 423, substantially rectangular in cross sectional shape, and extending into the positive battery socket shell 422 to form an internal blind slot. Alternatively, the positive socket shell slot 423 may extend entirely through the positive battery socket shell 422 (not shown). An angled positive tab socket electrically conductive trace 428 includes a prong contact trace 427 secured within the positive battery socket shell 422 and extending from a socket shell sill 424, and a terminal contact trace 429 in electrical contact with the positive battery terminal 388. The prong contact trace 427 forms an obtuse angle with the terminal contact trace 429 so as to provide clearance between the positive battery socket shell 422 and the surface of an underlying battery cover (not shown). The terminal contact trace 429 includes a terminal contact convex tab 426 partially enclosing the positive battery terminal 388. The terminal contact convex tab 426 can thus be held in electrical contact with the positive battery terminal 388 by an engine battery clamp (not shown). An electrical prong, such as, for example, the positive electrical prong 170 (shown in FIG. 4), the positive electrical prong 252 (shown in FIG. 9), the positive plug swivel prong 282 (shown in FIG. 11), and the positive plug retractable prong

332 (shown in FIG. 14), can be inserted into any of the positive socket shell slots 403, 413, 426 disclosed above for jump starting purposes.

FIG. 22 shows a side terminal battery 430 with a positive battery side terminal 432 and a negative battery side terminal 434 on a battery housing front surface 436. In the particular battery configuration shown, the positive battery dimple contact socket 180 has been secured to the battery housing front surface 436 between the positive battery side terminal 432 and a battery corner 433. The positive jumper plug 272 can be inserted using a canted downward motion directed at the positive socket shell slot 184. A negative battery dimple contact socket 270 is secured to the battery housing front surface 436 between the negative battery side terminal 434 and a battery front edge 438. A negative jumper plug 274 can be inserted using a downward motion directed at the negative socket shell slot 276. It can be appreciated by one skilled in the art that, for a different engine compartment arrangement, a battery manufacturer can reposition and secure the positive battery dimple contact socket 180 and the negative battery dimple contact socket 270 to different orientations and positions on the battery housing front surface 436.

FIG. 23 shows a positive cantilever prong jumper plug 450 including a rotatable positive plug cantilever prong 452 secured in a jumper plug grip 456. A corner slot 454 in the jumper plug grip 456 allows the positive plug cantilever prong 452, to rotate about a swivel pin 455, as indicated by arrow 453, from an open position, to a stored position completely concealed within the corner slot 454. A release button 451 functions to disengage the positive plug cantilever prong 452 from the stored position. There may be detents (not shown) provided inside the corner slot 454 to frictionally retain the positive plug cantilever prong 452 at a right angle. A fixed conductor 458 is secured within the jumper plug grip 456 to maintain an electrical conduction path between the positive plug cantilever prong 452 and the positive insulated electrical conductor 106 for any angular position of the positive cantilever prong 452. In the particular configuration shown, the positive cantilever prong jumper plug 450 includes a grip flat base 459 on the jumper plug grip 456 for a more compact, low-profile connector.

Another example of a battery with alternative contact socket orientations and positions is shown in FIG. 24. A side terminal battery 460 with a positive battery side terminal 462 and a negative battery side terminal 464 has the positive battery dimple contact socket 180 secured to a battery front surface 466 in electrical contact with the positive battery side terminal 462. A negative battery dimple contact socket 270 is secured to the battery front surface 466 in electrical contact with the negative battery side terminal 464. The positive cantilever prong jumper plug 450, with the positive plug cantilever prong 452 opened, is positioned for insertion into the positive battery dimple contact socket 180. A negative cantilever prong jumper plug 470, with an opened negative plug cantilever prong 472, is positioned for insertion into the negative battery dimple contact socket 270. The negative cantilever prong jumper plug 470 is similar to the positive cantilever prong jumper plug 450 except that the negative plug cantilever prong 472 has a different aspect ratio from that of the positive plug cantilever prong 452.

Figure 25:
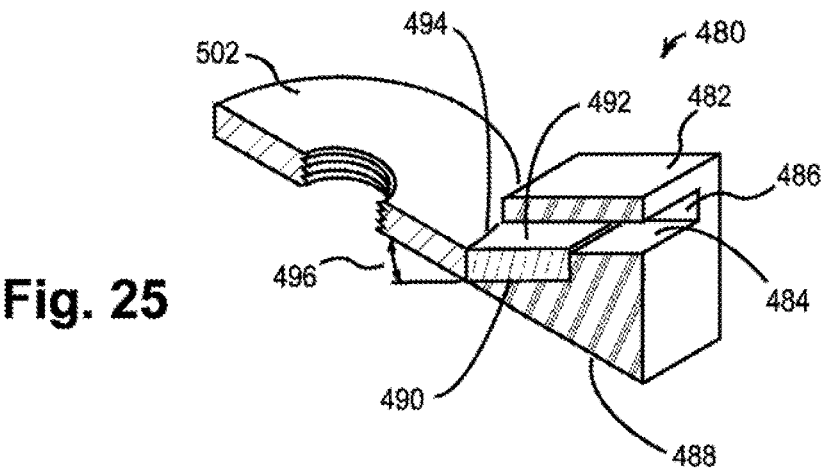
FIG. 25 is an isometric detail sectional view of a positive battery wedge contact socket electrically connected to a positive battery side terminal, in accordance with the present invention.

FIG. 25 is an isometric detail sectional view of a positive battery wedge contact socket 480 electrically connected to a positive battery side terminal 502. The positive battery wedge contact socket 480 includes a substantially wedge-shaped positive battery socket shell 482 with a socket shell sill 484 defining a positive socket inclined slot 486. The positive socket inclined slot 486 may extend through the positive battery socket shell 482 as shown, or may alternatively form an internal slot (not shown) that does not extend completely through the positive battery socket shell 482. The positive battery wedge contact socket 480 is supported on a planar socket shell base 488. The positive battery wedge contact socket 480 includes an essentially planar positive strip electrically conductive trace 490 that is inclined at an angle 496 to the planar socket shell base 488. This configuration provides for advantageous attachment of the planar socket shell base 488 onto a battery surface where an insertion of a mating electrical connector (not shown), to make electrical contact with an electrically conductive trace contact surface 492, requires finger clearance at the surface of the battery. The positive strip electrically conductive trace 490 may be electrically connected to the positive battery side terminal 502 with a conductive epoxy 494, for example, or a solder compound.

Figure 26:
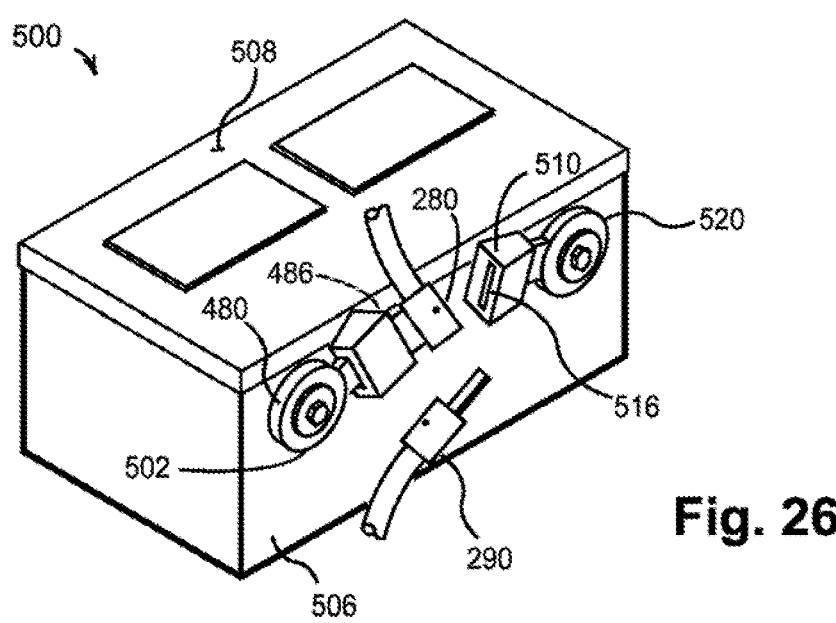
FIG. 26 shows a side terminal battery with a positive battery wedge contact socket electrically attached to a positive battery side terminal, and with a negative battery wedge contact socket electrically attached to a modified negative battery side terminal, in accordance with the present invention.

FIG. 26 shows a side terminal battery 500 with a battery cover 508, with the positive battery wedge contact socket 480 electrically attached to the positive battery side terminal 502, and with a negative battery wedge contact socket 510 electrically attached to a modified negative battery side terminal 520. The negative battery wedge contact socket 510 is dimensionally similar to the positive battery wedge contact socket 480 except that the positive socket inclined slot 486 has a smaller aspect ratio than does a negative socket inclined slot 516. The positive battery wedge contact socket 480 is attached to a battery housing front surface 506 between the positive battery side terminal 502 and the modified negative battery side terminal 520, but is canted away from the modified negative battery side terminal 520. The negative battery wedge contact socket 510 is attached to the battery housing front surface 506 between the modified negative battery side terminal 520 and the positive battery side terminal 502, but is canted away from the positive battery side terminal 502. This polarization of socket inclined slots 486, 516 ensures that the negative socket inclined slot 516 can accommodate only an appropriately configured negative mating electrical connector, such as the negative convertible jumper plug 290, whereas the positive socket inclined slot 486 has an aspect ratio configured to accommodate only an appropriately configured positive mating connector, such as the positive convertible jumper plug 280. Note that the positive convertible jumper plug 280 has been set at an angle, and the negative convertible jumper plug 290 is set to a straight position (i.e., zero degrees).

Figure 27:
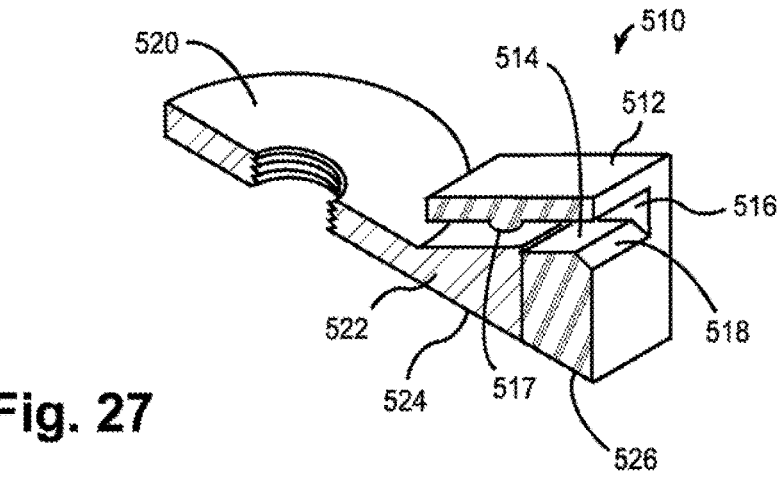
FIG. 27 is a detail view of the negative battery wedge contact socket and the modified negative battery side terminal of FIG. 26.

FIG. 27 is a detail view of the negative battery wedge contact socket 510 and the modified negative battery side terminal 520. The negative battery wedge contact socket 510 includes a negative battery socket shell 512 and a negative socket sill 514 defining the negative socket inclined slot 516. In this particular configuration, the negative socket sill 514 has a shell sill bevel 518, and there is a socket shell dimple 517 in the negative socket inclined slot 516. A negative socket electrically conductive trace 522 extends from the negative socket sill 514 and is preferably a unitary component with the modified negative battery side terminal 520 (i.e., a single component, not discrete components). Accordingly, the negative socket electrically conductive trace 522 is fabricated from the same material as the modified negative battery side terminal 520. The negative socket electrically conductive trace 522, which increases in thickness from the modified negative battery side terminal 520 into the negative battery wedge contact socket 510, has a planar trace base 524 which is secured to a battery housing surface (not shown) and lies in the same plane as a socket shell base 526.

It should be understood that, in accordance with the present invention, the configuration of battery socket slots is not limited to the rectangular parallelepiped slots used in the battery contact sockets 132, 134, 152, 154 in FIG. 3, in the battery contact sockets 180, 270 in FIG. 10, in the battery contact sockets 310, 350 in FIG. 13, in the compact negative battery contact socket 350 in FIG. 16, in the mini positive battery contact socket 370 in FIG. 17, in the positive battery lug contact socket 400 in FIG. 19, in the positive battery spade contact socket 410 in FIG. 20, in the positive battery tab contact socket 420 in FIG. 21, and in the battery wedge contact sockets 480, 510 in FIG. 26. As disclosed above, the jumper plugs 102, 104 112, 114 in FIG. 3, the jumper plugs 272, 274 in FIG. 10, the convertible jumper plugs 280, 290 in FIG. 12, the retractable jumper plugs 330, 390 in FIG. 18, and the cantilever prong jumper plugs 450, 470 in FIG. 24 include jumper plug prongs having a rectangular cross section, and are thus configured for insertion into battery socket shell parallelepiped slots.

Figure 28:
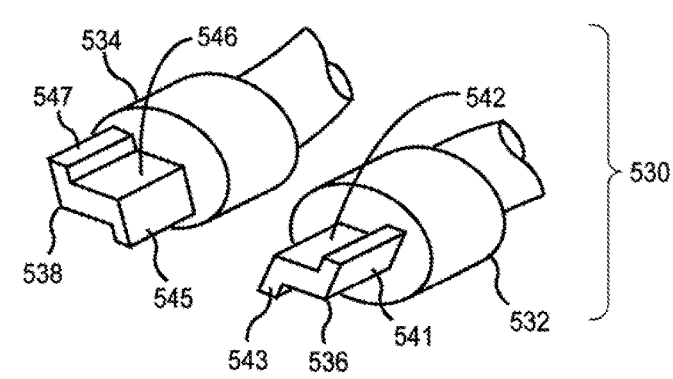
FIG. 28 is a polarized jumper plug pair including a positive jumper plug and a negative jumper plug prong, both prongs with obliquely opposed side ridges, in accordance with the present invention.

However, other jumper plug prong configurations, with non-rectangular cross sections, are also within the scope of the present invention. There is shown in FIG. 28 a polarized jumper plug pair 530 including a positive jumper plug 532 and a negative jumper plug 534. The positive jumper plug 532 includes a positive prong 536 with obliquely opposed side ridges 541, 543 on a central positive blade 542. The negative jumper plug 534 includes a negative prong 538 with obliquely opposed side ridges 545, 547 on a central positive blade 546. The negative prong 538 has a cross-sectional shape that is a mirror image of the cross-sectional shape of the positive prong 536.

Figure 29:
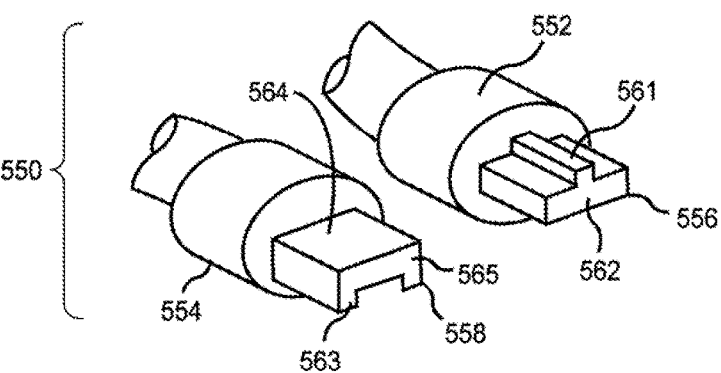
FIG. 29 is a polarized jumper plug pair including a positive jumper plug with a center ridge prong and a negative jumper plug with side ridges on the prong, in accordance with the present invention.

FIG. 29 shows a polarized jumper plug pair 550 including a positive jumper plug 552 and a negative jumper plug 554. The positive jumper plug 552 includes a positive prong 556 with a center ridge 561 on a central positive blade 562. The negative jumper plug 554 includes a negative prong 558 with opposing side ridges 563, 565 on a central negative blade 564. As can be appreciated, the negative prong 558 has a cross-sectional shape that is incongruous with the cross-sectional shape of the positive prong 556.

Figure 30:
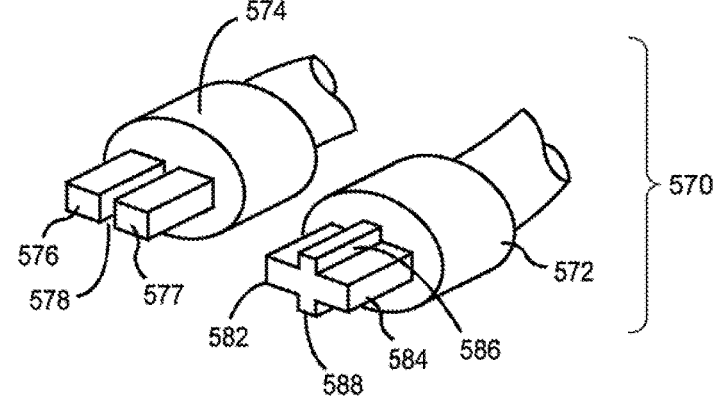
FIG. 30 is a polarized jumper plug pair including a positive jumper plug with central ridges on the prong and a negative jumper plug with in-line prong blades, in accordance with the present invention.

FIG. 30 shows a polarized jumper plug pair 570 that includes a positive jumper plug 572 and a negative jumper plug 574. The negative jumper plug 574 includes a pair of negative in-line prong blades 576, 577 separated by a center channel 578, the negative in-line prong blades 576, 577 configured to mate with a corresponding pair of in-line slots in a mating negative battery socket (not shown). The positive jumper plug 572 includes a positive prong 582 with symmetrically opposed central ridges 586, 588 on a central positive blade 584.

Figure 31:
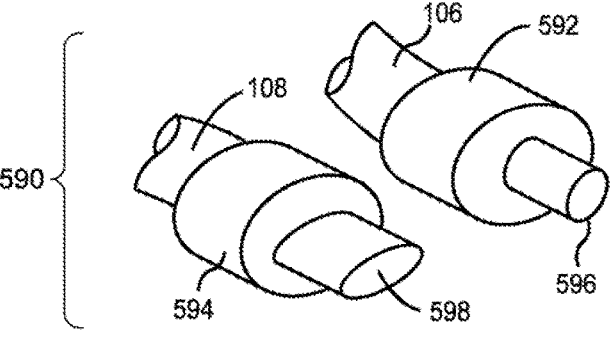
FIG. 31 is a polarized jumper plug pair including a positive jumper plug and a negative jumper plug with cylindrical prongs, in accordance with the present invention.

FIG. 31 show a polarized jumper plug pair 590 that includes a positive jumper plug 592 and a negative jumper plug 594. The positive jumper plug 592 includes a cylindrical positive prong 596, circular in cross-section, electrically connected to the positive insulated electrical conductor 106. The negative jumper plug 594 includes a cylindrical negative prong 598, substantially elliptical or oval in cross-section, electrically connected to the negative insulated electrical conductor 108. By inspection, it can be seen that the cylindrical negative prong 598 is greater in width (i.e., major axis) and smaller in height (i.e., minor axis), compared to the cylindrical positive prong 596 (i.e., equal axes).

Figure 32:
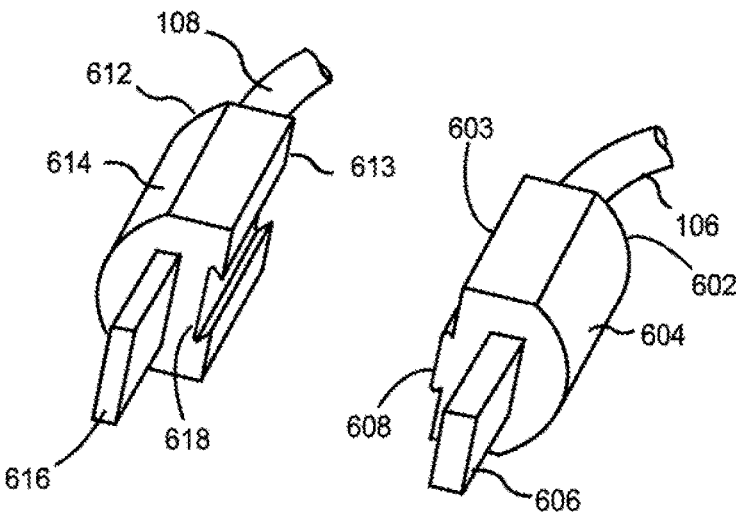
FIG. 32 is positive jumper plug with a positive jumper plug grip having a grip planar surface and a negative jumper plug with a negative jumper plug grip having a grip planar surface, in accordance with the present invention.

FIG. 32 shows a positive jumper plug 602 which includes a positive jumper plug grip 604 configured with a grip planar surface 603. A dovetail ridge 608 (i.e., having a substantially trapezoidal cross-section) extends from the grip planar surface 603. A positive electrical prong 606 extends from the positive jumper plug grip 604, and is substantially parallel to the grip planar surface 603. The planar positive electrical prong 606 is electrically connected to the positive insulated electrical conductor 106 inside the positive jumper plug grip 604. A negative jumper plug 612 includes a negative jumper plug grip 614 with a grip planar surface 613. A dovetail channel 618 lies below the grip planar surface 613 and is configured to physically mate with the dovetail ridge 608. A planar negative electrical prong 616 extends from the negative jumper plug grip 614, and is substantially parallel to the grip planar surface 613. The planar negative electrical prong 616 is electrically connected to the negative insulated electrical conductor 108 inside the negative jumper plug grip 614. It should be noted that the aspect ratio of the planar negative electrical prong 616 is greater than the aspect ratio of the planar positive electrical prong 606.

Figure 33:
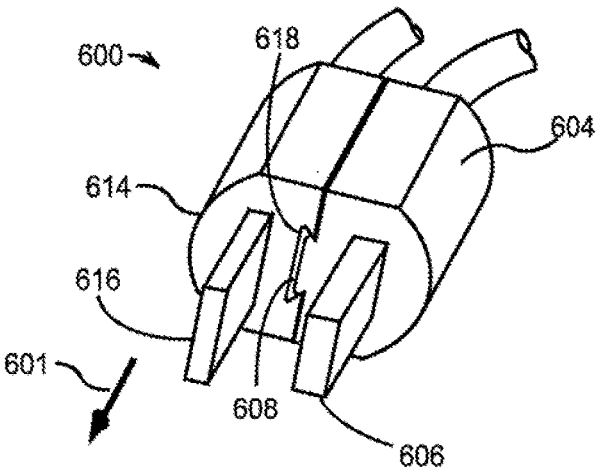
FIG. 33 shows the negative jumper plug grip of FIG. 32 mechanically affixed to the positive jumper plug grip to form a two-pronged polarized jumper plug, in accordance with the present invention.
Figure 34:
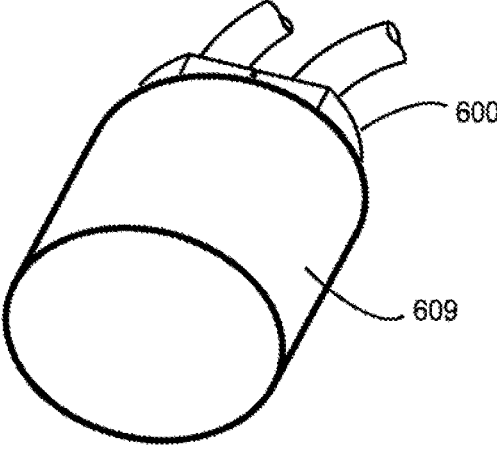
FIG. 34 shows the two-pronged polarized jumper plug of FIG. 33 with an electrically insulating boot, in accordance with the present invention.

FIG. 33 shows the negative jumper plug grip 614 mechanically affixed to the positive jumper plug grip 604, by insertion of the dovetail ridge 608 into the dovetail channel 618, to form a two-pronged polarized jumper plug 600. The planar positive electrical prong 606 is parallel to the planar negative electrical prong 616, and both electrical prongs 606, 616 are aligned with a polarized jumper plug longitudinal axis 601. In this configuration, the two-pronged polarized jumper plug 600 can be used to electrically connect to a dual-slot electrical socket in a battery transverse clamp, such as disclosed in U.S. Pat. No. 11,217,916 "Automotive Booster Cable System," incorporated by reference herein in its entirety. Alternatively, as shown in FIG. 34, an electrically insulating boot 609, made from a plastic or elastomer material, can be placed over the two-pronged polarized jumper plug 600 for storage and prevention of electrical shorting.

Figure 35:
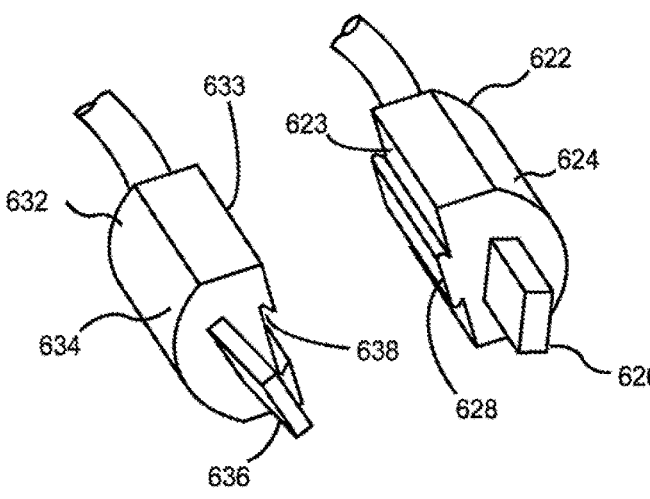
FIG. 35 shows a positive jumper plug and a negative jumper plug with canted prongs, in accordance with the present invention.
Figure 36:
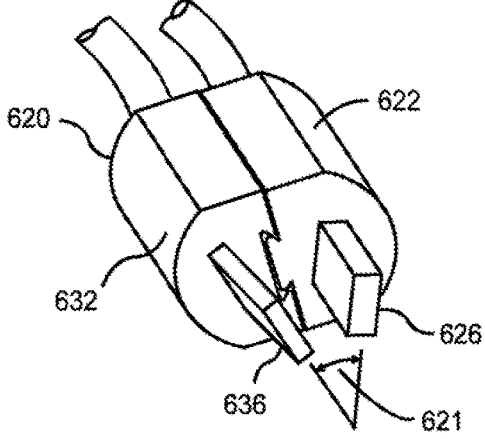
FIG. 36 shows the positive jumper plug and the negative jumper plug of FIG. 35 joined to form a two-pronged polarized jumper plug.

FIG. 35 shows an alternative configuration of a positive jumper plug 622 which includes a positive jumper plug grip 624 configured with a grip planar surface 623. A dovetail ridge 628 extends from the grip planar surface 623. A positive electrical prong 626 extends from the positive jumper plug grip 624 at an acute angle to the grip planar surface 623. A negative jumper plug 632 includes a negative jumper plug grip 634 with a grip planar surface 633. A dovetail channel 638 lies below the grip planar surface 633 and is configured to physically mate with the dovetail ridge 628. A planar negative electrical prong 636 extends from the negative jumper plug grip 634 at an acute angle to the grip planar surface 633. FIG. 36 shows the negative jumper plug grip 634 mechanically affixed to the positive jumper plug grip 624, by insertion of the dovetail ridge 628 into the dovetail channel 638, to form a two-pronged polarized jumper plug 620. The planar positive electrical prong 626 is oriented at an acute angle 621 to the planar negative electrical prong 636.

Figure 37:
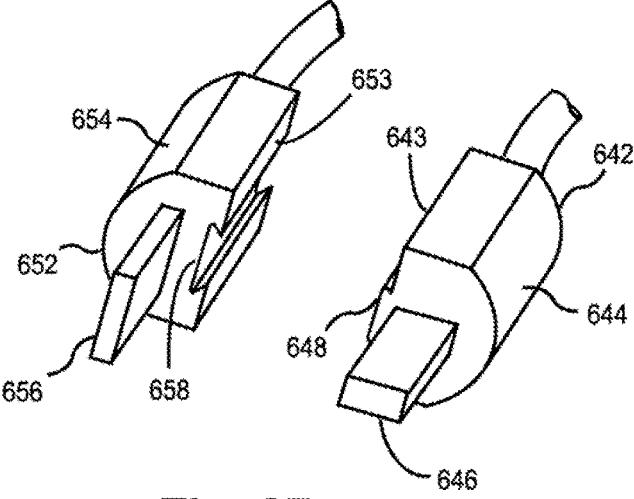
FIG. 37 shows a positive jumper plug and a negative jumper plug with prongs at right angles, in accordance with the present invention.

FIG. 37 shows yet another alternative configuration of a positive jumper plug 642 which includes a positive jumper plug grip 644 configured with a grip planar surface 643. A dovetail ridge 648 extends from the grip planar surface 643. A positive electrical prong 646 extends from the positive jumper plug grip 644 at a right angle to the grip planar surface 643. A negative jumper plug 652 includes a negative jumper plug grip 654 with a grip planar surface 653. A dovetail channel 658 lies below the grip planar surface 653 and is configured to physically mate with the dovetail ridge 648. A planar negative electrical prong 656 extends from the negative jumper plug grip 654, parallel to the grip planar surface 653.

Figure 38:
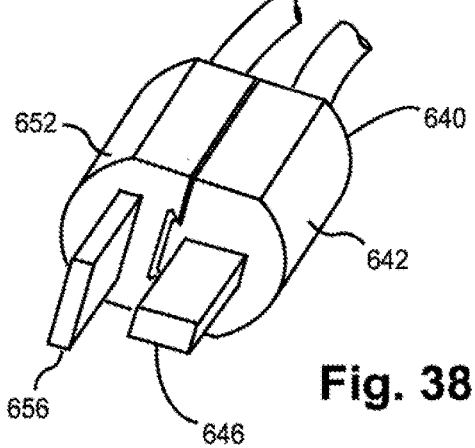
FIG. 38 shows the positive jumper plug and the negative jumper plug of FIG. 37 joined to form a two-pronged polarized jumper plug.

FIG. 38 shows the negative jumper plug grip 654 mechanically affixed to the positive jumper plug grip 644, by insertion of the dovetail ridge 648 into the dovetail channel 658, to form a two-pronged polarized jumper plug 640. The planar positive electrical prong 646 is oriented at a right angle to the planar negative electrical prong 656. As can be appreciated by one skilled in the art, other mechanical configurations are possible to secure the negative jumper plug grip 654 to the positive jumper plug grip 644, and lie within the scope of the present invention. It can be further appreciated by one skilled in the art that the above-disclosed two-pronged polarized jumper plug 620 and two-pronged polarized jumper plug 640 can also be used to electrically connect to a dual-slot electrical socket in a battery transverse clamp, such as disclosed in U.S. Pat. No. 11,217,916 "Automotive Booster Cable System."

It is to be understood that the description herein is only exemplary of the invention, and is intended to provide an overview for the understanding of the nature and character of the novel features of the disclosed battery embossed electrical contact socket configurations, and of the battery jumper plug cable configurations. The accompanying drawings are included to provide a further understanding of various aspects and embodiments of the devices of the invention which, together with their description and claims, serve to explain the principles and operation of the invention.

What is claimed is:

1. An automotive battery with a positive battery terminal and a negative battery terminal on a battery housing surface, said automotive battery comprising:

a positive battery contact socket attached to the battery housing surface adjacent to the positive battery terminal, said positive battery contact socket including a first, positive socket shell with a positive socket shell slot extending therethrough, such that a positive electrical prong can be inserted into said positive socket shell slot and make electrical contact with the positive battery terminal; and, a negative battery contact socket attached to the battery housing surface adjacent to the negative battery terminal, said negative battery contact socket including a second, negative socket shell with a negative socket shell slot extending therethrough, such that a negative electrical prong can be inserted into said negative socket shell slot and make electrical contact with the negative battery terminal.

2. The automotive battery as in claim 1 wherein said positive battery contact socket comprises a socket shell sill at a first end of said positive socket shell slot.

3. The automotive battery as in claim 2 wherein said socket shell sill comprises a shell sill bevel.

4. The automotive battery as in claim 1 wherein said first positive socket shell comprises a socket shell dimple protruding into said positive socket shell slot so as to provide retention of an inserted said positive electrical prong in said positive socket shell slot.

5. The automotive battery as in claim 1 further comprising an inverted U-shaped prong retention insert secured within the opening of said positive socket shell slot so as to provide retention of an inserted said positive electrical prong inside said positive socket shell slot.

6. The automotive battery as in claim 1 further comprising a positive electrically conductive trace disposed on the battery housing surface, a first end of said positive electrically conductive trace electrically connected to the positive battery terminal and a second end of said positive electrically conductive trace extending into said positive socket shell slot.

7. The automotive battery as in claim 6 wherein said second end of said positive electrically conductive trace extends to a socket shell sill at a first end of said positive socket shell slot.

8. The automotive battery as in claim 6 wherein said positive electrically conductive trace comprises an angled strip of a metal or a metal alloy having a sufficient cross-sectional area to safely conduct high amperage engine starter current.

9. The automotive battery as in claim 6 wherein said positive electrically conductive trace is configured to at least partially enclose the positive battery terminal and comprises one of a terminal contact lug ring, a terminal contact spade leg, or a terminal contact convex tab.

10. The automotive battery as in claim 1 wherein said positive electrical prong comprises a rectangular parallel-epiped of electrically conductive material.

11. The automotive battery as in claim 1 wherein said first positive socket shell is configured as an inverted U-shaped channel with a socket shell top, a first socket shell side attached to said socket shell top and to the battery housing surface, and a second socket shell side attached to said socket shell top and to the battery housing surface.

12. An automotive battery suitable for connecting with an electrical prong for charging purposes, said automotive battery comprising:

a battery housing with a battery terminal on a battery housing surface;

a battery contact socket with a socket shell slot, said battery contact socket attached to said battery housing surface, said socket shell slot extending through said battery contact socket as a through hole and configured for insertion of the electrical prong into said battery contact socket;

an electrically conductive trace, said electrically conductive trace including:

a terminal contact trace attached to said battery housing surface, said terminal contact trace secured in electrical contact with said battery terminal; and, a prong contact trace electrically attached to said terminal contact trace, said prong contact trace at least partially secured within said socket shell slot;

said electrically conductive trace having sufficient cross-sectional area to safely conduct high amperage engine starter current.

13. The automotive battery as in claim 12 wherein said battery contact socket is configured as an inverted U-shaped socket shell with a socket shell top, a first socket shell side attached to said socket shell top and to said battery housing surface, and a second socket shell side attached to said socket shell top and to said battery housing surface, wherein said socket shell top, said first socket shell side, and said second socket shell side are sized and configured for insertion of the electrical prong.

14. The automotive battery as in claim 12 further comprising:

a second battery contact socket with a second socket shell slot extending through said second battery contact socket, said second battery contact socket attached to said battery housing surface; and, a second electrically conductive trace attached to said battery housing surface and having one end in electrical contact with a second battery terminal, a second end of said second electrically conductive trace at least partially secured within said second socket shell slot.

15. The automotive battery as in claim 14 wherein said second socket shell slot extends from a second slot opening in said second battery contact socket, said second slot opening having an aspect ratio different from an aspect ratio of a first slot opening in said battery contact socket.

16. An automotive battery suitable for electrically connecting to an electrical prong for providing charging current to a battery terminal, said automotive battery comprising:

a battery housing; and, a battery contact socket attached to a surface of said battery housing adjacent to the battery terminal, said battery contact socket including an internal slot extending from a slot opening on said battery contact socket through said battery contact socket as a through hole, said internal slot configured such that insertion of the electrical prong into said slot opening enables the electrical prong to make electrical contact with one end of an electrically conductive trace inside said internal slot, said electrically conductive trace attached to said surface of said battery housing, wherein a second end of said electrically conductive trace is electrically attached to the battery terminal.

17. The automotive battery as in claim 16 wherein said electrically conductive trace comprises a strip of metal or metal alloy having a cross-sectional area sufficient to safely conduct high amperage engine starter current.

18. The automotive battery as in claim 16 wherein said battery contact socket comprises a unitary component formed with said battery housing.

\* \* \* \* \*